(12) United States Patent
Yamazaki et al.

(10) Patent No.: US 6,781,655 B2
(45) Date of Patent: Aug. 24, 2004

(54) ACTIVE-MATRIX LIQUID CRYSTAL DISPLAY WITH LINE/COLUMN INVERSION DRIVES, AND ASSOCIATED ELECTRONIC DEVICE

(75) Inventors: Yasushi Yamazaki, Suwa (JP); Takaaki Tanaka, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 115 days.

(21) Appl. No.: 10/073,871

(22) Filed: Feb. 14, 2002

(65) Prior Publication Data

US 2002/0113929 A1 Aug. 22, 2002

(30) Foreign Application Priority Data

Feb. 19, 2001 (JP) ........................................ 2001-042189
Mar. 29, 2001 (JP) ........................................ 2001-094979

(51) Int. Cl.[7] .......................... G02F 1/1337; G09G 3/36
(52) U.S. Cl. ........................ 349/123; 349/37; 349/128; 349/129; 345/87
(58) Field of Search ................... 349/123, 128, 349/129, 37; 345/87, 96

(56) References Cited

U.S. PATENT DOCUMENTS

| | | | | |
|---|---|---|---|---|
| 5,790,092 A | * | 8/1998 | Moriyama | 345/96 |
| 5,859,682 A | * | 1/1999 | Kim et al. | 349/124 |
| 5,880,798 A | * | 3/1999 | Walton et al. | 349/99 |
| 6,507,381 B1 | * | 1/2003 | Katsuya et al. | 349/130 |
| 2002/0012088 A1 | * | 1/2002 | Ozawa et al. | 349/123 |
| 2003/0122767 A1 | * | 7/2003 | Nakao et al. | 345/96 |

* cited by examiner

Primary Examiner—Tarifur R. Chowdhury
(74) Attorney, Agent, or Firm—Oliff & Berridge, PLC

(57) ABSTRACT

An active-matrix liquid crystal display is composed of an active matrix substrate, a liquid crystal, and an opposite substrate having a common electrode. The active matrix substrate fabricates a first group of pixel electrodes that are aligned and supplied with picture signals of a first polarity, and a second group of pixel electrodes that are aligned to adjoin with the first group of pixel electrodes respectively and are supplied with picture signals of a second polarity. An inorganic orientation film is formed on the surface of the active matrix substrate to provide a first orientation direction (Ra) to its proximal liquid crystal molecules, while an organic orientation film is formed on the surface of the opposite substrate to provide a second orientation direction (Rb), rectangularity crossing the first orientation direction, to its proximal liquid-crystal molecules.

27 Claims, 14 Drawing Sheets

ACTIVE-MATRIX LIQUID CRYSTAL DISPLAY WITH LINE/COLUMN INVERSION DRIVES, AND ASSOCIATED ELECTRONIC DEVICE

BACKGROUND OF THE INVENTION

1. Field of the Invention

This invention relates to liquid crystal displays, particularly, active-matrix liquid crystal displays for use in electronic devices such as color image projectors, which operate with line inversion drives and column inversion drives.

2. Description of the Related Art

Conventionally, liquid crystal displays of the projection type (namely, liquid crystal display projectors) use active-matrix liquid crystal displays as their liquid crystal light valves, which act as light modulators. The active-matrix liquid crystal display contains an active-matrix substrate that fabricates signal lines electrodes, and switching elements for pixels, and its opposite substrate having common electrodes, wherein these substrates are arranged opposite to each other and are separated from each other with a prescribed gap via a seal material. A liquid crystal is held in such a gap between the substrates of the active-matrix liquid crystal display. A large number of 'pixel electrodes' are arranged on the prescribed display area of the display, and they are respectively encompassed by data lines and scan lines. Hence, the pixel electrodes are arranged in a matrix form on the screen of the display.

The recent mainstream technology for active-matrix liquid crystal displays is called a 'Twisted Nematic' (simply abbreviated in 'TN') mode. This is because the liquid crystal displays of the TN mode provide high brightness, high contrast, and relatively high-speed response, while they can be driven with relatively low voltages and are easy to control in gradations. That is, the liquid crystal displays of the TN mode provide various characteristics, which are essential for the existing displays, with a good balance. The TN mode employs the prescribed structure in which liquid-crystal molecules are twisted in their long-axis directions between the active-matrix substrate and its opposite substrate. Generally speaking, the twisted-nematic liquid crystal display (or 'TNLCD') uses a liquid crystal whose twisted-nematic molecules align on a helical axis in the absence of an electric field, twisting polarized light up to 90°.

An alignment direction for aligning liquid-crystal molecules is regulated by surface conditions of the substrates. That is, the liquid-crystal molecules cannot all always be aligned in the prescribed direction by simply aligning them in parallel to the screen surface of the liquid crystal display because they have a certain degree of freedom with respect to the alignment direction. One method for ensuring an alignment of liquid-crystal molecules in the specific direction is to physically control them in their long-axis directions by providing surfaces of the substrates with coating materials or channels directing an alignment in a specific direction. Specifically, the surface of the substrate is coated with a polyimide resin having a specific orientation to form an orientation film thereon. The orientation can be further enhanced by forming scratches extending in the specific direction on the surface of the orientation film. In addition, there are also provided several measures in orientation processes to provide a specific orientation to the orientation film formed on the surface of the substrate. For example, a so-called rubbing method is used to rub the orientation film with the cloth wound about a roll, or a slanted deposition (or slanted evaporation) method is used to deposit an inorganic material in a slanted direction to form an orientation film.

More specific descriptions will be made with respect to a typical example of the active-matrix liquid crystal display that uses thin-film transistors (namely 'TFT') as switching elements for pixels. That is, the active-matrix liquid crystal display is composed of an active-matrix substrate for fabricating scan lines, data lines, pixel electrodes and thin-film transistors, and its opposite substrate having common electrodes, wherein a liquid crystal layer is narrowly held in a gap between these substrates that are arranged opposite to each other and are separated from each other via a seal material.

On a front surface of the active-matrix substrate directly facing with the liquid crystal layer, a large number of data lines and scan lines are wired to intersect with each other in grid patterns in connection with thin-film transistors, so that each thin-film transistor is arranged in proximity to a point of intersection between each data line and each scan line. In addition, pixel electrodes are connected to the data lines and scan lines by means of the thin-film transistors respectively. One pixel is defined as a region that contains each one pixel electrode as well as its related data line, scan line, and thin-film transistor. Thus, the active-matrix liquid crystal display can display images of dots by activating respective pixels that are arranged in a matrix form.

Orientation films urging liquid-crystal molecules to prescribed orientation states in a non-power mode (or a power-off mode) where no voltage is applied between the substrates are respectively formed on surfaces of the active-matrix substrate and its opposite substrate sandwiching the liquid crystal layer. Conventionally, the orientation films are composed of orientational high molecular materials such as polyimide, so that organic orientation films whose surfaces are subjected to rubbing processes are widely used. In the rubbing process, the prescribed rubbing cloth is used to rub the surface of the film in a certain direction.

In the active-matrix substrate, regions forming data lines, scan lines, and thin-film transistors have a greater number of layers compared to regions forming pixel electrodes. That is, peripheral portions of pixels containing data lines, scan lines, and thin-film transistors are increased in height compared to center portions of pixels. This causes differences in height being formed between the peripheral portions and center portions of the pixels on the active-matrix substrate.

Recently, liquid crystal displays are manufactured with very fine structures by decreasing dimensions of pixels. In the rubbing process of the orientation film, the rubbing cloth does not make good contact with the differences and their neighboring areas on the active-matrix substrate. Thus, it is very difficult to perform the rubbing process completely on the entire surface area of the orientation film.

If the rubbing process is made incomplete with respect to boundary areas corresponding to neighboring areas of differences formed between peripheral portions and center portions of pixels, defectiveness may occur in these areas of the orientation film. In a non-power mode, liquid-crystal molecules will not be sufficiently regulated by the orientation film in proximity to the aforementioned boundary areas. This may cause orientation failures in which liquid-crystal molecules become unstable in orientation due to various factors. That is, a so-called 'reverse tilt domain' (i.e., a region in which liquid-crystal molecules have different directions in building up or tilting) is caused to occur at the boundary areas between the peripheral portions and center portions of the pixels. This may cause display failures such as leakage of light.

In the slanted deposition method, deposition may not be completely performed around peripheral portions of pixels because of shadows of the differences. For this reason, as the display is manufactured with a very fine structure, it may cause a noticeable increase for orientation-incomplete areas in which the orientation process was not performed completely with respect to the orientation film formed on the surface of the active-matrix substrate. In the orientation-incomplete areas substantially corresponding to the peripheral portions of pixels, liquid-crystal molecules are not sufficiently regulated in accordance with the prescribed orientation, so they become unstable in orientation due to various factors. In short, the substrate of the active-matrix liquid crystal display must withstand an orientation-failure state. This may cause so-called disinclination, i.e., a region that provides a difference of orientation directions of liquid-crystal molecules with respect to an area between the peripheral portion and center portion of the pixel. Therefore, a display failure such as leakage of light occurs at a boundary of the aforementioned region.

The aforementioned orientation failure can be solved by making the substrate surface flat or planar, thus allowing the orientation process to be completely performed on any portions of pixels. Specifically, it is possible to provide the following methods for the flattening or planarization of the substrate surface.

(i) Signal lines are embedded in channels that are formed on the surface of the substrate.

(ii) After wiring signals lines on the substrate, they are embedded in an insulation film having a high degree of planarization.

(iii) The insulation film is made flat or planar by using chemical mechanical polishing (abbreviated as 'CMP').

Conventionally, the active-matrix liquid crystal display has employed so-called called 'frame inversion drive', which provides polarity inversions for picture signals applied to the liquid crystal with respect to each of frames, in consideration of the lifetime (or service life) of the liquid crystal material. By using the frame inversion drive, it may be possible to increase the lifetime of the liquid crystal material. However, it causes flickering (fluctuations of lights or pictures) due to strokes between adjoining pixels on the screen, which may deteriorate the quality of the display. As solutions to flickering that may occur on the screen of the display, it is possible to use various types of display drive techniques called 'column inversion drive' and 'line inversion drive'. That is, the column inversion drive provides polarity inversions for picture signals with respect to each of adjoining data lines, and the line inversion drive provides polarity inversions for picture signals with respect to each of adjoining scan lines.

Even though the orientation failure is solved by improving the planarization of the substrate, the aforementioned line inversion drive and column inversion drive may cause display failures due to the aforementioned disinclination at the peripheral portions of pixels. This is because in the line inversion drive and column inversion drive, picture signals having different polarities are supplied to adjoining pixels respectively so that a lateral electric field appears between the adjoining pixel electrodes of the active-matrix substrate in addition to a vertical electric field that appears between the pixel electrodes of the active-matrix substrate and the common electrodes of the opposite substrate, wherein the vertical electric field directly contributes to driving the liquid crystal. Under effects of the lateral electric field, liquid-crystal molecules may be disturbed in alignment.

SUMMARY OF THE INVENTION

It is an object of the invention to provide a liquid crystal display, employing line inversion drive and/or column inversion drive, which can reduce display failures due to disinclination caused by a lateral electric field that appears between adjoining pixel electrodes on a substrate.

An active-matrix liquid crystal display of this invention is basically composed of an active matrix substrate fabricating signal lines and pixel electrodes, a liquid crystal, and a opposite substrate having a common electrode. The liquid crystal is held between the active matrix substrate and opposite substrate, which are arranged opposite to each other. On the active matrix substrate, there are arranged a first group of pixel electrodes that are aligned in a prescribed direction and are supplied with picture signals of a first polarity, and a second group of pixel electrodes that are aligned to adjoin with the first group of pixel electrodes respectively and are supplied with picture signals of a second polarity. Liquid-crystal molecules lying in proximity to the active matrix substrate are initially oriented in a first orientation direction (a) in a non-power mode in such a way that their long-axis directions are parallelized with alignment directions of the first and second groups of pixel electrodes. Alternatively, they are oriented in such a way that their long-axis directions cross with the alignment directions of the first and second groups of pixel electrodes. In this case, they are twisted in such a way that their long-axis directions extend from the active matrix substrate to the opposite substrate and lie across the first and second groups of pixel electrodes on the active matrix substrate in plan view. In addition, liquid-crystal molecules lying in proximity to the opposite substrate are initially oriented in a second orientation direction (Rb) that rectangularly crosses the first oration direction.

In the active-matrix liquid crystal display of this invention, an inorganic material such as a silicon oxide is subjected to slanted deposition to form an inorganic orientation film on the surface of the active matrix substrate, while an organic orientation film is formed on the surface of the opposite substrate that is composed of orientational high molecules of a polyimide. The slanted deposition is performed one time to form one type of pillar structure in which pillars are arranged and are slanted in a specific direction on the active matrix substrate. Alternatively, the slanted deposition is performed multiple times to provide mixtures of pillar structures that are slanted in different directions. Thus, it is possible to form an orientation film without using an organic orientation film requiring the rubbing process that may result in incomplete orientation even though the active matrix substrate have many differences in height. Therefore, the rubbing process is performed with respect to the organic orientation film of the opposite substrate. The orientation films apply different pre-tilt angles to liquid-crystal molecules in relation to the active matrix substrate and opposite substrate respectively. That is, the first pre-tilt angle, which preferably ranges from 3° to 30°, imparted to liquid-crystal molecules lying in proximity to the active matrix substrate becomes larger than the second pre-tilt angle imparted to liquid-crystal molecules lying in proximity to the opposite substrate.

The aforementioned orientations reliably reduce influences of lateral electric fields, which occur at a power-on mode in response to line inversion drive to cause unwanted motions for liquid-crystal molecules, in particular, liquid-crystal molecules lying between adjoining pixel electrodes electrified at different potentials respectively in proximity to the active matrix substrate. Thus it is possible to reduce the occurrence of disinclination due to lateral electric fields, thus reducing display failures.

BRIEF DESCRIPTION OF THE DRAWINGS

These and other objects, aspects, and embodiments of the present invention will be described in more detail with reference to the following drawing figures, in which.

DESCRIPTION OF THE PREFERRED EMBODIMENTS

This invention will be described in fisher detail by way of examples with reference to the accompanying drawings.

Before specifically describing embodiments of this invention basic configurations and operations of liquid crystal displays of this invention will be described with reference to various drawing figures.

From studies and examinations to determine causes of display failure due to disinclination in line and column inversion drives of liquid crystal displays, it can be concluded that relationships between directions of lateral electric fields occurring on active-matrix substrates and orientation directions of liquid-crystal molecules at an initial condition (or a non-power mode) are greatly involved in the occurrence of the disinclination. Incidentally, the orientation direction of liquid-crystal molecules may be defined as the orientation direction of the orientation process effected on the substrate of the liquid crystal display. The details will be described with reference to various drawing figures. Hereinafter, descriptions are made provisionally with respect to the twisted nematic mode having a positive dielectric anisotropy.

Figure 1A:
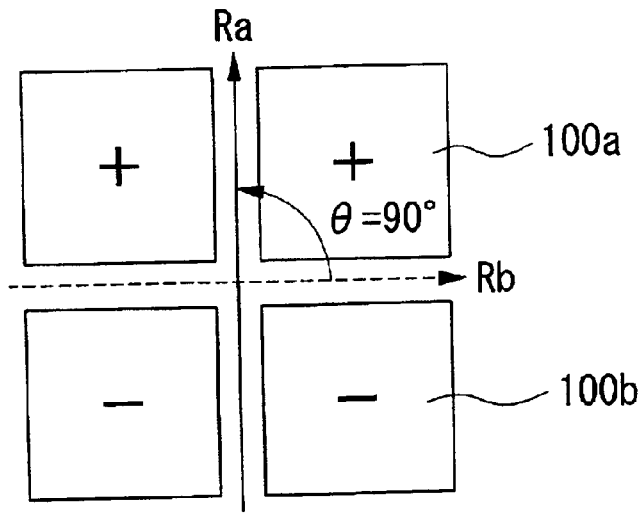
FIG. 1A is a simplified diagram showing a rectangular arrangement of pixel electrodes in connection with orientation directions of subs of an active-matrix liquid crystal display of a conventional configuration.
Figure 1B:
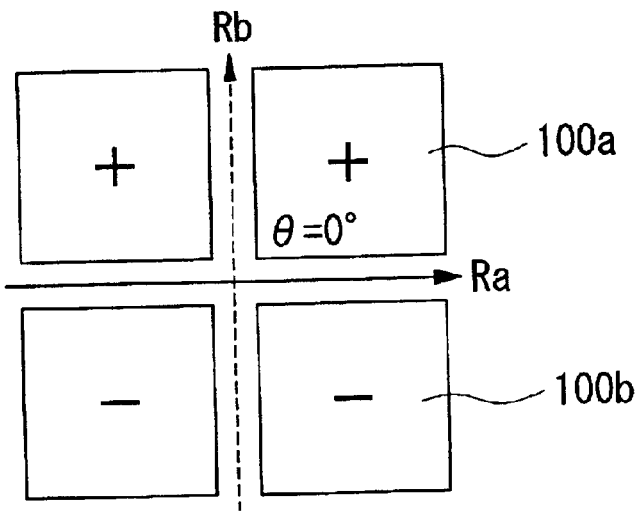
FIG. 1B is a simplified diagram showing a rectangular arrangement of pixel electrodes in connection with orientation directions of substrates of an active-matrix liquid crystal display in accordance with a first basic configuration of this invention.
Figure 1C:
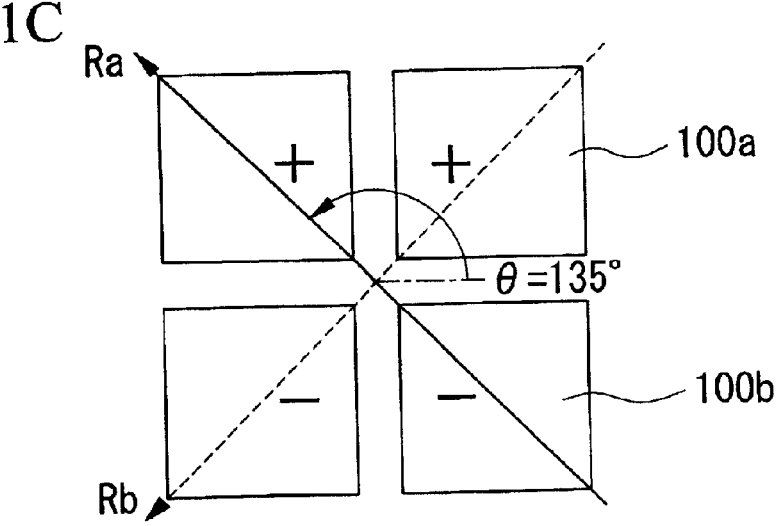
FIG. 1C is a simplified diagram showing a rectangular arrangement of pixel electrodes in connection with orientation directions of substrates of an active-matrix liquid crystal display in accordance with a second basic configuration of this invention.

FIGS. 1A, 1B, and 1C diagrammatically show relationships between directions of lateral electric fields occurring on active-matrix substrates and orientation directions of liquid-crystal molecules. Specifically, FIG. 1A shows a relationship between them with respect to a conventional configuration; FIG. 1B shows a relationship between them with respect to a liquid crystal display of a first basic configuration of this invention; and FIG. 1C shows a relationship between them with respect to a liquid crystal display of a second basic configuration of this invention. All FIGS. 1A to 1C show four pixel electrodes each denoted by a rectangular block. Herein, a positive polarity potential (+) is supplied to two pixel electrodes 100a in the upper side, while a negative polarity potential (−) is supplied to two pixel electrodes 100b in the lower side. Therefore the lateral electric fields direct upwards.

In FIGS. 1A to 1C, solid-line arrows 'Ra' designate orientation directions imparted to the active-matrix substrate. These figures are created based on scan lines in a horizontal direction; therefore, the orientation directions Ra are set based on 'horizontal' scan lines. In addition, each of the orientation directions Ra is denoted by a solid-line arrow that is revolved in a counterclockwise direction with a certain angle 'θ' measured based on the horizontal scan line. In the case of the conventional configuration shown in FIG. 1A, the orientation direction Ra of the active-matrix substrate is revolved in the counterclockwise direction with 90° from the horizontal scan line. In the case of the first basic configuration of this invention shown in FIG. 1B, the orientation direction Ra is not revolved in the counterclockwise direction from the horizontal scan line; therefore, θ is set to 0°. In the case of the second basic configuration of this invention shown in FIG. 1C, the orientation direction Ra is revolved in the counterclockwise direction with 135° from the horizontal scan line. All of these figures are creed with respect to the active-matrix liquid crystal display of the TN mode, wherein dotted-line arrows 'Rb' are also drawn to indicate orientation directions of opposite substrates. The orientation direction Rb of the opposite substrate is farther revolved in the counterclockwise direction with 90° from the orientation direction Ra of the active-matrix substrate.

Figure 2:
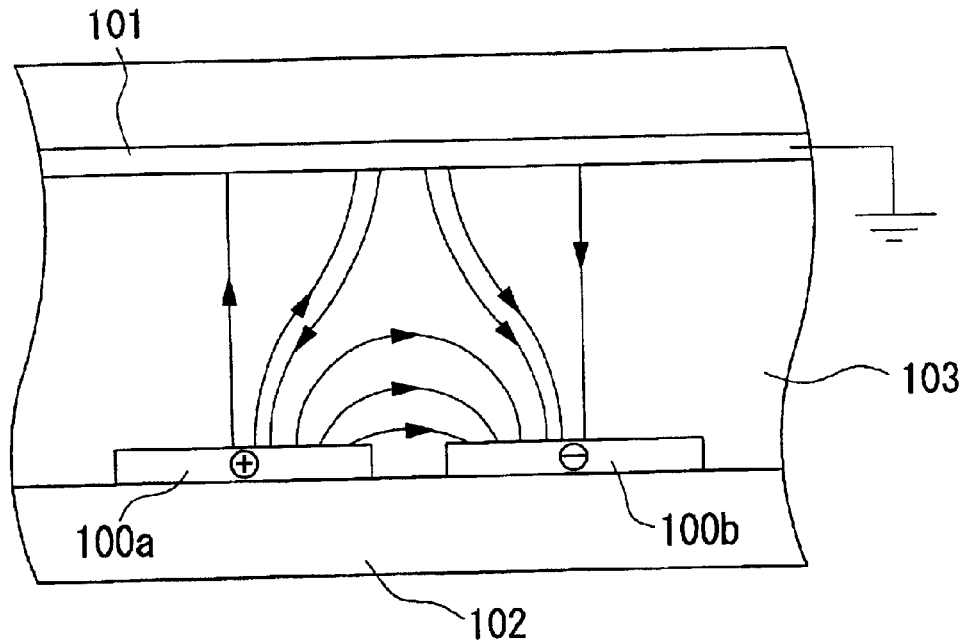
FIG. 2 is a simplified sectional view of an active-matrix liquid crystal display in which a vertical electric field and a lateral electric field are generated by applying a prescribed voltage between a common electrode and pixel electrodes.

FIG. 2 diagrammatically shows an electric field that is generated when a certain voltage is applied between a common electrode 101, and pixel electrodes 100a and 100b respectively. A positive potential is applied to the pixel electrode 100a; a negative potential is applied to the pixel electrode 100b; and a ground potential is applied to the common electrode 101. A liquid crystal layer 103 is arranged between an active-matrix substrate 102 and its opposite substrate. In the actually manufactured product of the active-matrix liquid crystal display, prescribed 'effective' potentials substantially establishing the aforementioned relationship between potentials are applied to the common electrode 101, and the pixel electrodes 100a and 100b respectively. In the electric field shown in FIG. 2, imaginary lines and curves are drawn to represent partial electric fields, namely, vertical and lateral electric fields. In an area to the left, a vertical electric field is generated in a direction from the center of the pixel electrode 100a to the common electrode 101. In an area to the right, a vertical electric field is generated in a direction from the common electrode 101 to the center of the pixel electrode 100b. In a certain area of the liquid crystal layer 103 that lies in proximity to the active-matrix substrate 102, a lateral electric field is generated in a direction from the pixel electrode 100a to the pixel electrode 100b in their peripheral portions.

Figure 3A:
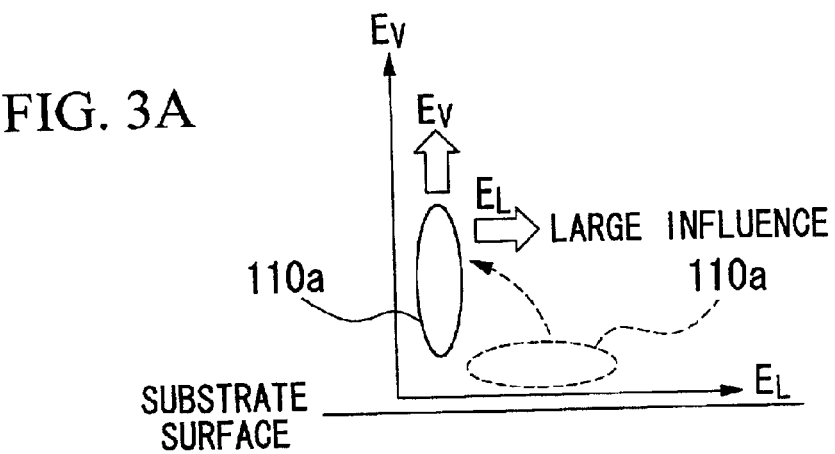
FIG. 3A is a graph showing an influence of a lateral electric field to a liquid-crystal molecule that is forced to build up by a vertical electric field in the conventional configuration shown in FIG. 1A.

The aforementioned vertical and lateral electric fields may have prescribed influences to liquid-crystal molecules, which will be described with respect to the first basic configuration of this invention shown in FIG. 1B. In the case of the conventional configuration shown in FIG. 1A, the orientation direction Ra of the active-matrix substrate 102 lies in parallel to the direction of the lateral electric field that directs from the positively charged pixel electrode 100a to the negatively charged pixel electrode 100b. Herein, the orientation direction Ra corresponds to a long-axis direction of each liquid-crystal molecule in a non-power mode. FIG. 3A shows an influence on a liquid-crystal molecule 100a due to a vertical electric field (or a longitudinal electric field) 'EV' and a lateral electric field (or a transverse electric field) 'EL'. In the non-power mode, the liquid-crystal molecule 110 (see dotted mark in FIG. 3A) lies in parallel to the substrate surface under the assumption that no pre-tilt is imparted thereto; therefore, its long axis directs in parallel to the direction of the lateral electric field EL.

When a prescribed voltage is applied between the common electrode and pixel electrodes, the liquid-crystal molecule 110a (see solid-line mark in FIG. 3A) builds up under the influence of the vertical electric field, so that its long axis revolves in the counterclockwise direction and stays along the direction of the vertical electric field EV. At this time, the lateral electric field EL imparts substantially no influence on the liquid-crystal molecule 110a that lies in proximity to the center of the pixel electrode. That is the liquid-crystal molecule 110a builds up substantially along the direction of the vertical electric field EV. However, the lateral electric field imparts some influences to other liquid-crystal molecules that lie around the peripheral portion of the pixel electrode. In the vicinity of the peripheral portion of the pixel electrode, even though the liquid-crystal molecule is forced to build up along the direction of the vertical electric field EV, it cannot fully build up along the direction of the vertical electric field EV due to the influence of the lateral electric field EL. That is, the liquid-crystal molecule around the peripheral portion of the pixel electrode tilts towards the direction of the lateral electric field EL. Herein, a degree of tilting depends on a balance of forces between the vertical electric field and lateral electric field. The above-described phenomenon may cause separate regions in which liquid-crystal molecules differ in orientations with respect to the center and the peripheral portion of the pixel electrode. This may be a cause of the 'disclination', which in turn causes a display failure in the conventional configuration.

In contrast to the conventional configuration, the first basic configuration of this invention (see FIG. 1B) sets the orientation direction Ra substantially perpendicular to the lateral electric field. FIG. 3D shows that in the non-power mode, a liquid-crystal molecule 110b (see a dotted mark) initially lies in parallel to the substrate surface, and its long axis is directed in a direction three-dimensionally perpendicular to the lateral electric field EL.

Figure 3B:
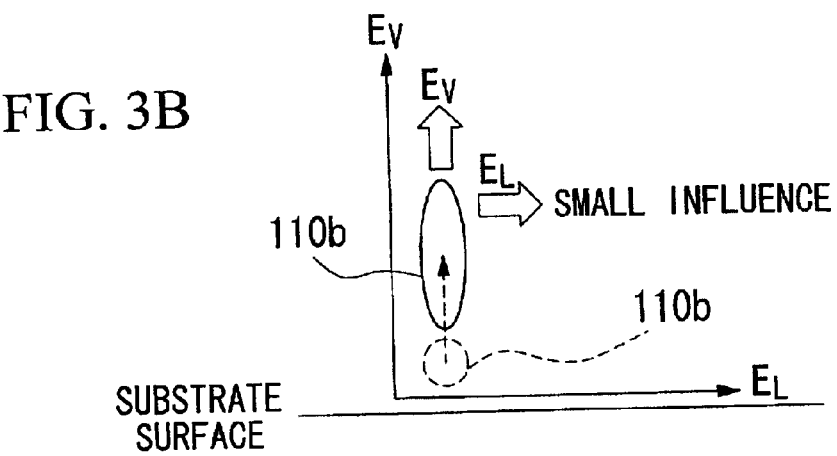
FIG. 3B is a graph showing an influence of a lateral electric field to a liquid-crystal molecule that is forced to build up by a vertical electric field in the first basic configuration of this invention shown in FIG. 1B.

When a prescribed voltage is applied between the common electrode and the pixel electrodes, the liquid-crystal molecule 110b (see solid-line mark in FIG. 3B) is forced to build up along the direction of the vertical electric field EV. Herein, the lateral electric field EL exerts substantially no influence on the liquid-crystal molecule 110b that lies in proximity to the center of the pixel electrode; therefore, the liquid-crystal molecule 110b builds up substantially along the direction of the vertical electric field EV. Even in the first basic configuration of this invention, the lateral electric field EL may exert small influence on other liquid-crystal molecules that lie around the peripheral portion of the pixel electrode. However, it can be said that the lateral electric field EL exerts very small influence on liquid-crystal molecules in their motions in the first basic configuration of this invention compared to the conventional configuration.

In the conventional configuration shown in FIG. 1A in which the orientation direction Ra lies in parallel to the direction of the lateral electric field EL, even though the liquid-crystal molecule 110a initially lying in parallel to the substrate surface is forced to build up due to the influence of the vertical electric field EV, the lateral electric field EL may force the liquid-crystal molecule 110a to move backwards and towards its original position. In short, the conventional configuration has a drawback in that the liquid-crystal molecule 110a is easily influenced by the lateral electric field EL. In contrast to the conventional configuration, the first basic configuration of this invention is designed in such a way that the orientation direction Ra is set in parallel to the direction of the lateral electric field EL. This shows that when at liquid-crystal molecule 110b initially lying in parallel to the substrate surface is forced to build up along the diction perpendicular to the substrate surface the direction of the build-up motion of the liquid-crystal molecule 110b rectangularly crosses the direction of the lateral electric field EL. That is, the liquid-crystal molecule 110b is hardly influenced by the lateral electric field EL. Therefore, it is possible to reduce the chance of occurrence of the disinclination in the first basic configuration of this invention compared to the conventional configuration. As a result, it is possible to reduced the chance of occurrence of display failures due to the disinclination.

The aforementioned reasons that the first basic configuration of this invention can reduce the occurrence of the disinclination may be partly repeated with respect to the second basic configuration of this invention shown in FIG. 1C. In the case of the second basic configuration of this invention, long-axis directions of liquid-crystal molecules lying in proximity to the active-matrix substrate are slanted against alignment directions of electrodes, which are adequately allocated to distinct electrode forming regions, namely, a first electrode group region and a second electrode group region formed in a directivity from the active-matrix substrate to its opposite substrate. That is, liquid-crystal molecules are arranged such that their long-axis directions are twisted between the first electrode group region and the second electrode group region. Like the first basic configuration of this invention, liquid-crystal molecules in these regions are hardly influenced by the lateral electric field in the second basic configuration of this invention compared to the conventional configuration because of a rectangular relationship between the orientation direction of the liquid-crystal molecules of intermediate layers of the liquid crystal and the direction of the lateral electric field. Therefore, it is possible to reduce the occurrence of the disinclination in the second basic configuration of this invention.

The above is a qualitative description for operating principles of this invention. We, the inventors, have made various tests and simulations with respect to transmission factors (or transmittances) of active-matrix liquid crystal displays by changing their orientation directions. Furthermore, we have actually confirmed and obtained results that the first and second basic configurations of this invention contribute to noticeable reductions of regions causing the disinclination in the active-matrix liquid crystal display. Details of simulation results will be described later.

In addition, it is preferable that pre-tilting be imparted to liquid-crystal molecules lying in proximity to the active-matrix substrate Preferably, the pre-tilt angle is set in a prescribed range from 3 to 30°. In the existing conventional liquid crystal displays, pre-tilt angles are set in a range from 1° to 3°. By increasing the pre-tilt angle further, liquid-crystal molecules will hardly be influenced by the lateral electric field; therefore, it is possible to further reduce the occurrence of the disinclination. However, if the pre-tilt angle exceeds 30°, the light transmittance of the display decreases in a white-color display mode, in other words, the screen of the display is unfavorably darkened.

Concretely speaking, there are provided various types of methods for increasing the pre-tilt angle and regulating it in the desired range from 3° to 30°. As an example of a method that is superior in control of the pre-tilt angle, it is possible to provide a slanted deposition that is used to form an inorganic material film on the active-matrix substrate as its orientation film. By adjusting an angle of the slanted deposition, it is possible to adequately control the pre-tilt angle. In another example of the method that is effective for increasing the pre-tilt angle, the slanted deposition is performed multiple times while changing deposition directions within the plane of the substrate, so that it is possible to form a non-oriented film corresponding to a mixture of pillar structures of an inorganic material. Herein, the pillar structures contain pillar structure that are inclined in one direction and other pillar structures that are inclined in other directions.

As described above, this invention can reliably reduce the occurrence of the disinclination due to the lateral electric field effected between adjoining pixel electrodes on the active-matrix substrate. When the surface of the active-matrix substrate is smoothed and flattened with respect to the first and second electrode group regions and other regions forming signal lines for driving electrodes, it is possible to reduce occurrence of orientation failures in the formation of the orientation film. Thus, it is possible to noticeably reduce occurrence of display failures.

Incidentally, the aforementioned first and second basic configurations are designed for the active-matrix liquid crystal display of the TN (i.e., Twisted Nematic) mode that contains a liquid crystal whose twisted-nematic molecules have a twisting angle of 90°. Of course, the first and second basic configurations are not necessarily limited to the TN mode; hence, they can be applied to any other modes of liquid crystal displays.

Next, other basic configurations of this invention will be described with reference to FIGS. 4A and 4B, wherein like the foregoing configurations shown in FIGS. 1B and 1C, an active-matrix substrate provides a first electrode group region for linearly arranging electrodes supplied with picture signals of the same polarity and a second electrode group region for linearly arranging electrodes supplied with picture signals of the opposite polarity. The first and second groups of electrodes are arranged to adjoin with each other. This active-matrix liquid crystal display is advantageous because it can furthermore reduce influences of a lateral electric field that is generated in a power-on mode, especially with respect to the line inversion drive and column inversion drive.

Figure 4A:
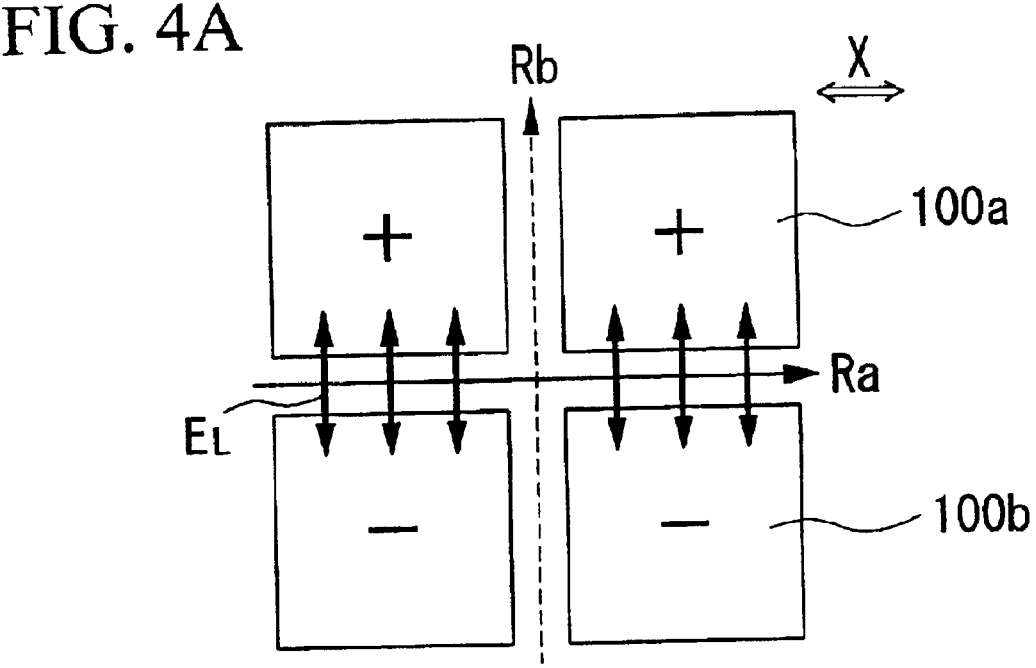
FIG. 4A is a simplified diagram showing a rectangular arrangement of pixel electrodes in connection with orientation directions of substrates of an active-matrix liquid crystal display in accordance with a third basic configuration of this invention.

The third basic configuration of this invention shown in FIG. 4A provides a counterclockwise revolution of about 90° for the orientation direction Ra, which is applied to liquid-crystal molecules lying in proximity to the active-matrix substrate in the non-power mode, compared to the direction of the lateral electric field EL that occurs in the power-on mode. Thus, it is possible to reduce influences of the lateral electric field EL imparted to liquid-crystal molecules in the power-on mode. That is, it is possible to reduce occurrence of disinclination due to the lateral electric field EL.

Figure 4B:
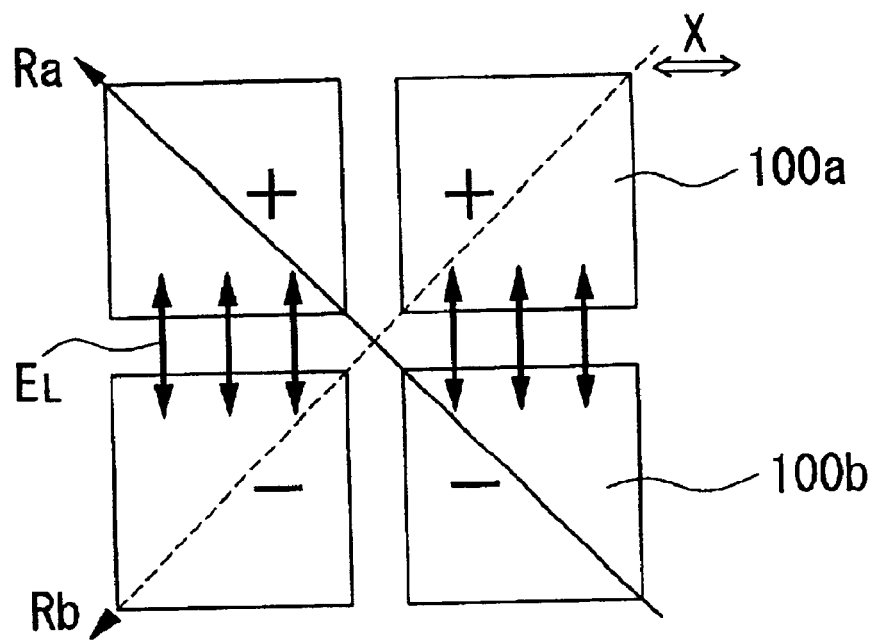
FIG. 4B is a simplified diagram showing a rectangular arrangement of pixel electrodes in connection with orientation directions of substrates of an active-matrix liquid crystal display in accordance with a fourth basic configuration of this invention.

The configurations shown in FIGS. 4A and 4B are identical to the foregoing configurations shown in FIGS. 1B and 1C; hence, the detailed description thereof will be omitted.

First Embodiment

Next, an active-matrix liquid crystal display will be described in detail in accordance with a first embodiment of the invention.

Figure 5:
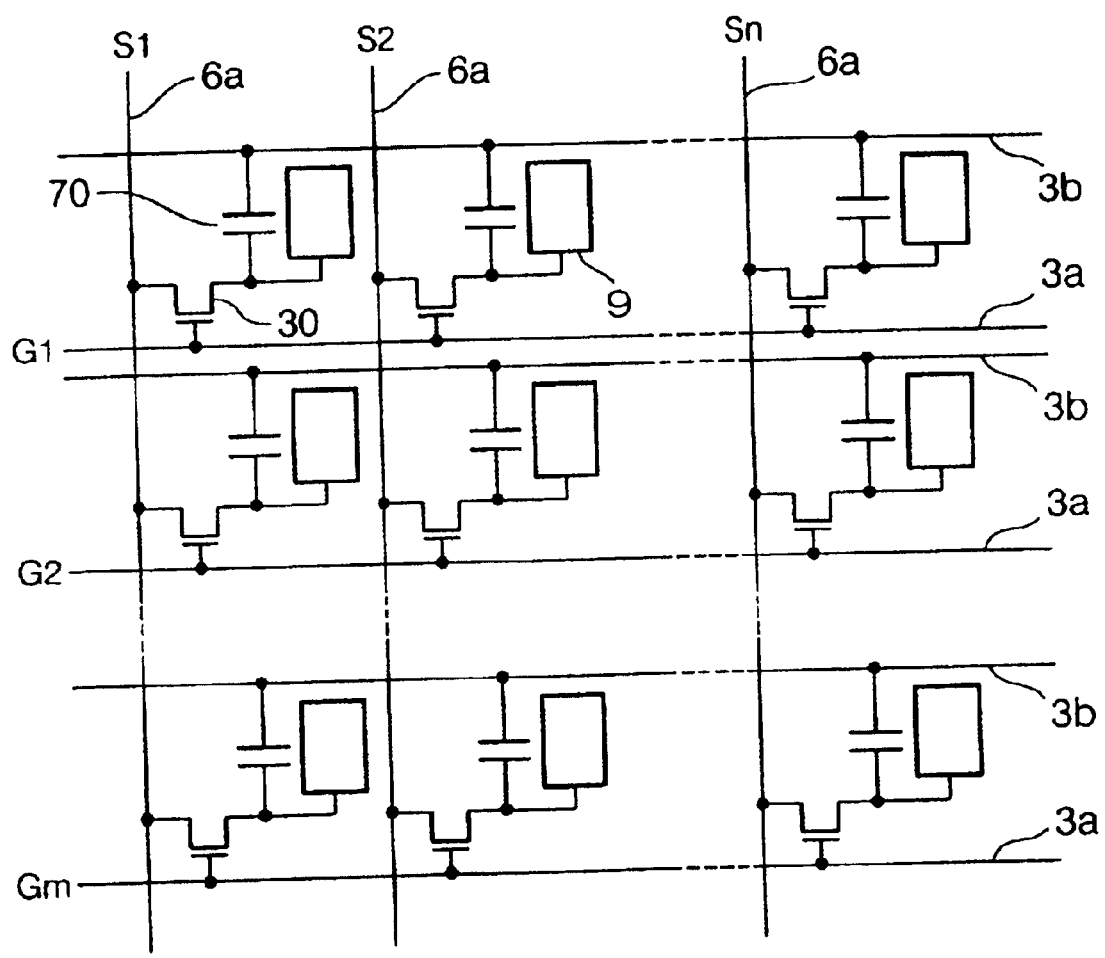
FIG. 5 is a circuit diagram showing an equivalent circuit for pixels that are arranged in a matrix form to provide pixel electrodes, switching elements, and signal lines in an active-matrix liquid crystal display in accordance with a first embodiment of the invention.
Figure 6:
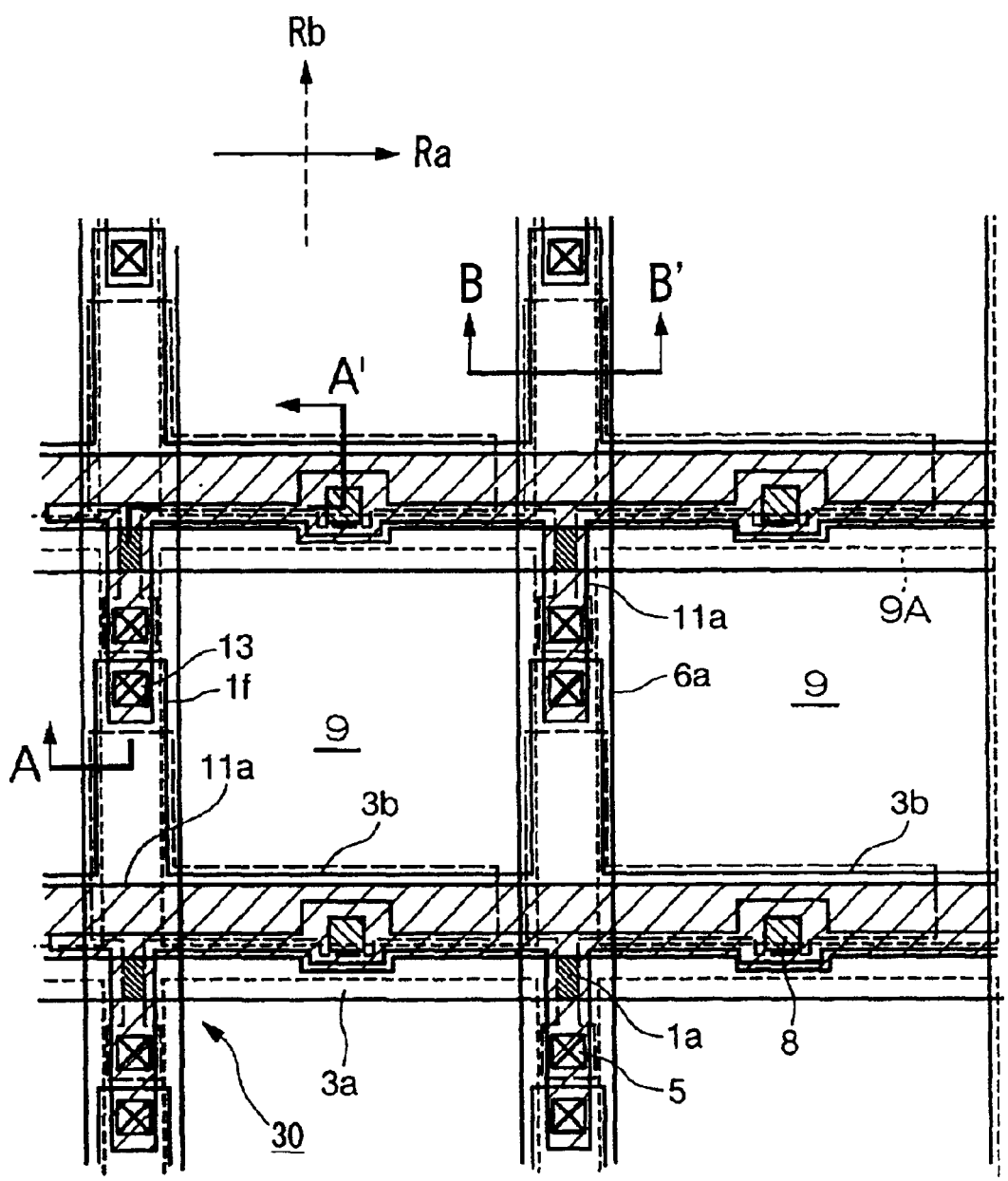
FIG. 6 is a plan view partly in section showing structures and arrangements of pixels of the active-matrix liquid crystal display of the first embodiment of the invention.
Figure 7:
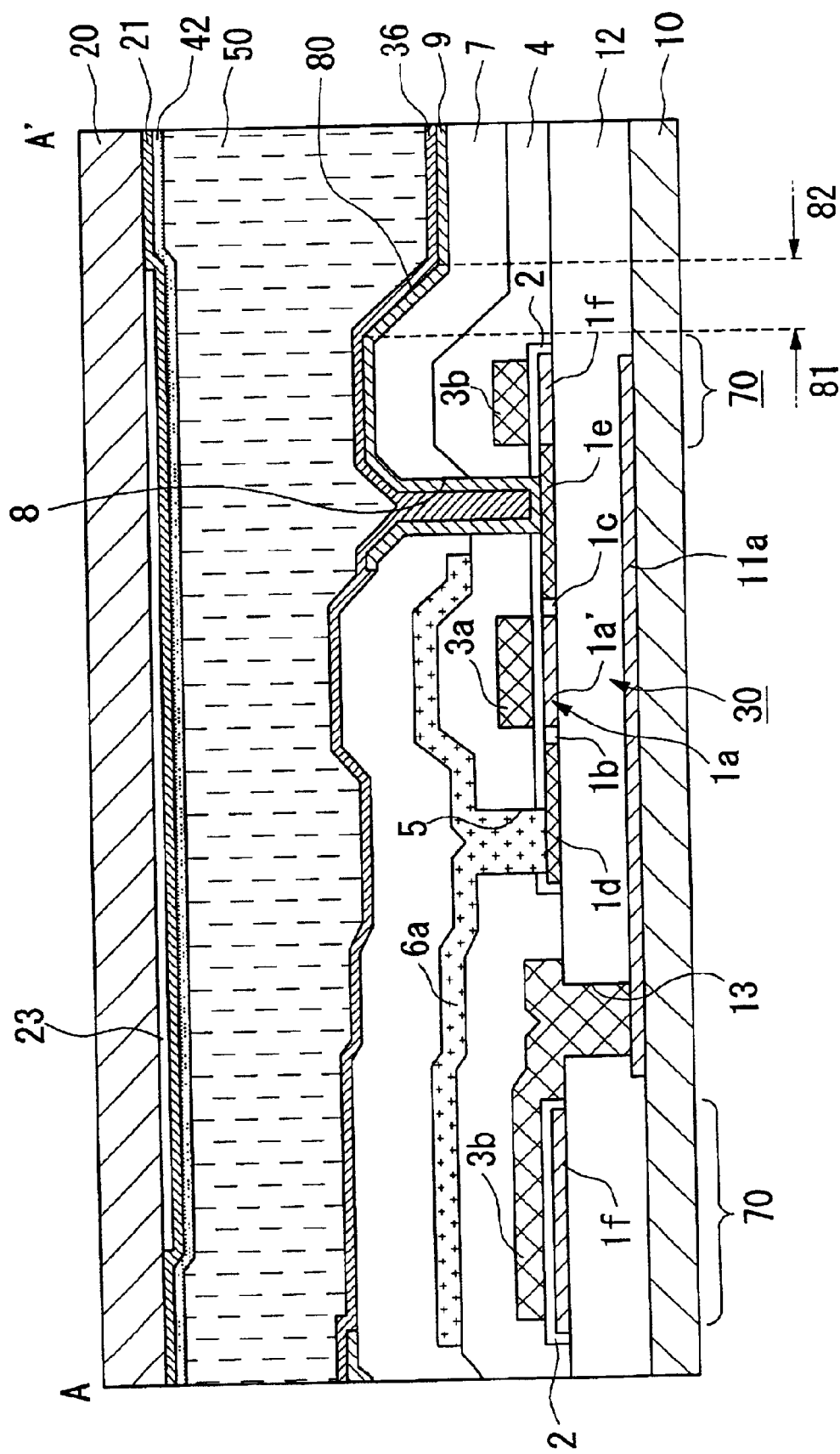
FIG. 7 is a cross-sectional view taken along line A–A' of FIG; 6.

The active-matrix liquid crystal display of the first embodiment is of the TN mode, which will be described with reference to FIGS. 5 to 8. FIG. 5 shows an equivalent circuit for switching elements (i.e., thin-film transistors), signal lines, and other electric components of pixels that are arranged in a matrix form on the screen (or display area) of the active-matrix liquid crystal display, FIG. 6 is a plan view showing adjoining pixels composed of data lines, scan lines, and pixel electrodes formed on a TFT array substrate (i.e., an active-matrix substrate). FIG. 7 is a cross-sectional view of the illustration of FIG. 6 taken along line A–A', and FIG. 8 is a cross-sectional view of the illustration of FIG. 6 taken along line B–B'.

Figure 8:
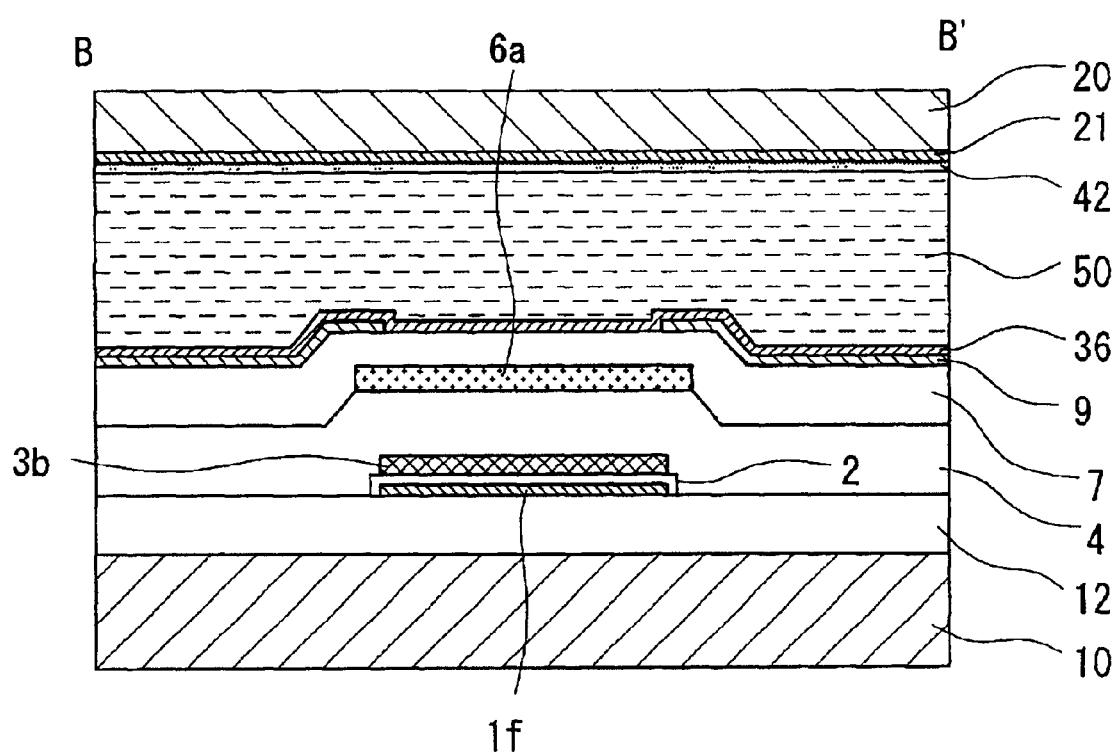
FIG. 8 is a cross-sectional view taken along line B–B' of FIG. 6.

The illustration of FIGS. 6 to 8 are adequately changed or adjusted in scales in order to clearly show layers and members in visually recognizable sizes and shapes.

Each of the pixels that are arranged in a matrix form on the prescribed display area of the active-matrix liquid crystal display of the present embodiment shown in FIG. 5 is composed of a pixel electrode 9 and a thin-film transistor (abbreviated in 'TFT') 30, which is a switching element for the pixel electrode 9. In addition, a data line 6a transmitting a picture signal is wired vertically and is electrically connected to the source of the thin-film transistor 30. Therefore, the multiple data lines 6a are respectively wired in connection with the multiple pixel electrodes 9 and are supplied with picture signals S1, S2, . . . , Sn. These picture signals are sequentially supplied to the data lines 6a in their numbering order. Alternatively, the data lines 6a are divided into plural groups each corresponding to adjoin pixels; hence, the picture signals are supplied to the data lines 6a with respect to each of the groups. A scan line 3a transmitting a scan signal is horizontally wired and is electrically connected to the gate of the thin-film transistor 30. Therefore, the multiple scan lines 3a are respectively wired in connection with the multiple pixel electrodes 9 and are supplied with scan signals G1, G2, . . ., Gm. These scan signals consisting of pulses occurring at prescribed timings are sequentially supplied to the scan lines 3a in their numbering order. Furthermore, the pixel electrode 9 is electrically connected the drain of the thin-film transistor 30, which is turned on for a certain time period. By sequentially turning on the thin-film transistors 30, the picture signals S1, S2, . . . , Sn sequentially supplied onto the data lines 6a are respectively written to the liquid crystal by the pixel electrodes 9 at prescribed timings.

In the above, the picture signals S1, S2, . . . , Sn each having a prescribed level are written to a liquid cystal by means of the pixel electrodes 9 and are retained for a certain time period between the pixel electrodes 9 and common electrodes, which will be described later. The liquid crystal is varied in orientation and organization of molecular aggregations due to voltage levels applied thereto, so that light modulation occurs to enable gradations in display. In the case of the so-called 'normally white mode', for example, the incident light is decreased in transmission value in response to the applied voltage. In the case of the 'normally black mode', the incident light is increased in transmission value in response to the applied voltage. Thus, the liquid crystal display outputs light having the prescribed constant in response to the picture signals. In order to avoid leakage of picture signals retained in the liquid cystal for a while, an accumulative capacitance 70 is additionally provided in parallel with the capacitance of the liquid crystal that is held between the pixel electrode 9 and the common electrode.

FIG. 6 shows that multiple 'transparent' pixel electrodes 9 whose contours are shown by dotted lines 9A are arranged in a matrix form consisting of rows and columns on the TFT array substrate of the liquid crystal display of the present embodiment. Along boundaries of the pixel electrodes 9, the data lines 6a are wired vertically while the scan lines 3a and capacitance lines 3b are wired horizontally. Specifically, the data line 6a, scan line 3a, and pixel electrode 9 are arranged in connection with a semiconductor layer 1a that is composed of polysilicon film, or example. That is, the data line 6a is electrically connected to the source region of the semiconductor layer 1a via a contact hole 5; and the pixel electrode 9 electrically connected to the drain region of the semiconductor layer 1a via a contact hole 8. In addition, the scan line 3a is arranged opposite to the channel region (see a hatched part in FIG. 6) of the semiconductor layer 1a. Therefore, the prescribed part of the scan line 3a directly arranged opposite to the channel region acts as a gate electrode. The material for the semiconductor layer 1a is not necessarily limited to the polysilicon; hence, it is possible to use other materials, one of which is a lamination of single crystal silicon, for example.

The capacitance line 3b is composed of two regions, namely, first and second regions. The first region of the capacitance line 3b is a linear portion that substantially extends straight along the scan line 3a in plan view. The second region of the capacitance line 3b is a projection portion that projects upwards (i.e., towards its adjacent pixel of an upper row) along the data line 6a in plan view from the intersection of the capacitance line 3b and the data line 6a. First light shield or shading films (see horizontally elongated hatched portions, simply referred to first shield films) 11a are arranged and horizontally extend along the scan lines 3a respectively. Each of the first shield films 11 a is positioned to cover the prescribed area of the thin-film transistor 30 including the channel region of the semiconductor layer 1a in the view of the TFT array substrate. Specifically, the first shield film 11a is composed of two regions, namely, a linear portion and a projection portion. The linear portion of the first shield film 11a is arranged opposite to the capacitance line 3b and extends straight along the scan line 3a. The projection potion of the first shield film 11a projects downwards (i.e., towards its adjust pixel of a lower row) along the data line 6a in plan view from the intersection between the data line 6a and the first shield film 11a. A tip end of the 'downward' projection portion of the first shield film 11a for each row of pixels overlaps with a tip end of the 'upward' projection portion of the capacitance 13b for the next row of pixels under the data line 6a. At such an overlap area, a contact hole 13 is arranged to provide a mutual electric connection between the first shield film 1a and the capacitance line 3b. That is, the first shield film 11a is electrically connected to the capacitance line 3b for the next row of pixels via the contact hole 13.

With reference to FIG. 7, a description will be given with respect to a sectional structure (A–A') of the liquid crystal display of the present embodiment, which has a 'transparent' TFT array substrate 10 and an opposite substrate 20. The TFT array substrate 10 is composed of quart, silica or hard glass, while the opposite substrate 20 is composed of quart; silica, or glass, for example, The TFT army substrate 10 has a pixel electrode 9, which is a transparent conductive film composed of an indium tin oxide (abbreviated 'ITO'), for example. A thin-film transistor (TFT) 30 is arranged adjacent to the pixel electrode 9 on the TFT array substrate 10, and it acts as a switching element for a switching control of the pixel electrode 9. The thin-film transistor 30 has a called lightly doped drain LDDS) stemmas, which provides a scan line 3a, a channel region 1a' of a semiconductor layer 1a whose channel is formed by an electric field caused by the scan line 3a, an insulation thin film 2 for insulating the scan line 3a and the semiconductor layer 1a, and a data line 6a, as well as a low concentration source region 1b, a low concentration drain region 1c, a high concentration source region 1d, and a high concentration drain region 1c of the semiconductor layer 1a.

A second-interlayer insulation film 4 is formed above the insulation film 2 on the TFT array substrate 10 so as to contain the scan line 3a and the capacitance line 3b. In the second-interlayer insulation film 4, a contact hole 5 is formed to communicate with the high concentration source region 1d in relation to the data line 6a, and a contact hole 8 is formed to communicate with the high concentration drain region 1e in relation to the pixel electrode 9. That is, the data line 6a is electrically connected to the high concentration source region 1d via the contact hole 5 penetrating through the second-interlayer insulation film 4. In addition, a third-interlayer insulation film 7 is formed above the data line 6a and the second-interlayer insulation film 4. The contact hole 8 communicating with the high concentration drain region 1e is also formed to penetrate through the third-interlayer insulation film 7. That is, the high concentration drain region 1e is electrically connected to the pixel electrode 9 via the contact hole 8 that penetrates through the second-interlayer insulation film 4 and the third-interlayer insulation film 7 respectively. Incidentally, an electric connection between the pixel electrode 9 and the high concentration drain region 1e can be established by way of an aluminum film, which forms the same layer for the data line 6a, or a polysilicon film which forms the same layer for the scan line 3a.

It is preferable that the thin-film transistor 30 employ the aforementioned LDDS structure. It is possible to employ an offset structure in which impurity ions are not implanted into prescribed regions corresponding to the low concentration source region 1b and the low concentration drain region 1c. Alternatively, it is possible to use a thin-film transistor of a self alignment type in which the high concentration source region and high concentration drain region are formed using the gate electrode as a mask in a self-matching manner by implantation of impurity ions at a high concentration.

The present embodiment employs a single gate structure for the thin-film transistor 30 in which only a single gate electrode corresponding to a part of the scan line 3a is arranged between the source region and drain region. Of course, it is possible to arrange two or more sate electrodes between the source region and drain region, wherein the same signal is supplied to both the gate electrodes. That is, it is possible to construct the thin-film transistor 30 having dual gates (or double gates), triple gates, or more. By arranging two or more gate electrodes between the source region and drain region, it is possible to prevent current leakage from occurring at the channel and the joint portion between the source region and drain region. Thus, it is possible to reduce an electric current flowing through the thin-film transistor that is turned off. Incidentally, it is possible to modify the thin-film transistor in such a way that at least one gate electrode employs the LDDS structure or offset structure.

As shown in FIGS. 7 and 8, the insulation thin film 2 that acts as a gate insulation film is extended from the prescribed position opposite to the gate electrode, which corresponds to a part of the scan line 3a, and is used as a dielectric film. The semiconductor layer 1a is extended to form a first accumulative capacitance electrode 1f. In addition a part of the capacitance line 3b opposite to the aforementioned dielectric film and the first accumulative capacitance electrode 1f is used as a second accumulative capacitance electrode. Thus, an accumulative capacitance 70 is constructed by the combination of the dielectric film, first accumulative capacitance electrode 1t, and second accumulative capacitance electrode. Specially, the high concentration drain region 1e of the semiconductor layer 1a is extended beneath the data line 6a and the scan line 3a, so that its extended portion is arranged opposite to a part of the capacitance line 3b, which is extended along the data line 6a and the scan line 3a, via the insulation thin film 2 as the first accumulative capacitance electrode 1f. The accumulative capacitance 70 can be formed with a relatively small area and a large capacitance when the insulation thin film 2 that acts as a dielectric for the accumulative capacitance 70 has a small thickness and a high pressure resistance in particular, when the insulation thin film 2 matches the gate insulation film of the thin-film transistor 30 that is formed on the polysilicone film by high temperature oxidation.

As shown in FIG. 7, the first shield film 11a is formed at the prescribed position realizing formation of the thin-film transistor 30 that is formed on the surface of the TFT array substrate 10. In addition, a first-interlayer insulation film (or an insulation layer) 12 is arranged between the first shield film 11a and multiple thin-film transistors 30. The first-interlayer insulation film 12 is provided to electrically insulate the semiconductor layer 1a, which forms a part of the in-film transistor 30, from the first shield film 11a. The first-interlayer insulation film 12 is formed on the entire surface area of the TFT array substrate 10. In order to eliminate differences of patterns of the first shield film 11a in height, the planarization process is performed by surface polishing. This polarization process is important to laminate single crystal silicon together. The first-interlayer insulation film 12 is composed of a highly insulating glass, silicon oxide film, or silicon nitride film, for example. The first-interlayer insulation film 12 can prevent the first shield film 11a from contaminating the thin-film transistor 30 beforehand.

The first shield film 11a and the capacitance line 3b electrically connected thereto are connected to a constant potential source (not shown); hence, both the first shield film 11a and the capacitance line 3b are set at the constant potential. Therefore, even though the thin-film transistor 30 is arranged opposite to the first shield film 11a, it would not be badly influenced by potential variations of the first shield film 11a. In addition, the capacitance line 3b can reliably function as the second accumulative capacitance electrode for the accumulative capacitance 70. As the constant potential source, it is possible to use a negative or positive power source for supplying electric power to peripheral circuits (e.g., scan line drive circuits, data line drive circuits, etc.) driving the liquid crystal display, a ground power source, and a constant potential source for supplying the constant potential to the common electrode. By using the aforementioned power source for the peripheral circuits and the like, it is possible to set both the first shield film 11a and the capacitance line 3b at the constant potential without providing dedicated potential lines and eternal input terminals.

In FIG. 7, the first shield film 11a is arranged opposite to the first accumulative capacitance electrode 1f via the first-interlayer insulation film 12 in the opposite side of the capacitance line 3b that acts as the second accumulative capacitance electrode, so that it acts as a third accumulative capacitance electrode for the accumulative capacitance 70 (see its right side). Since the first shield film 11a acts as the third accumulative capacitance electrode, it is possible to further provide an additional accumulative capacitance for the accumulative capacitance 70. The present embodiment provides a double active capacitance structure at both sides of the first accumulative capacitance electrode If, so that it increases the accumulative capacitance 70 further more.

As shown in FIGS. 6 and 7, the TFT array substrate 10 provides the first shield film 11a, which is electrically connected to the capacitance line 3b being wired for the former row or latter row in arrangement of pixels, via the contact hole 13. Compared with the foregoing structure in which the first shield film 11a is only connected with the capacitance line wired for the next row of pixels, it is possible to reduce differences between a drain region, in which the capacitance line 3b and the first shield film 11a are formed being overlapped with the data line 6a along edges of an opening area of each pixel, and other regions. That is, the present embodiment can noticeably reduce differences being formed along edges of opening areas of pixels. Therefore, it is possible to reduce the occurrence of disinclination (or orientation failure) of the liquid crystal caused by the differences. In other words, it is possible to enlarge an opening area with respect to each pixel. The contact hole 13 is opened at the prescribed position in the projection portion of the first shield film 11a that projects from its linear portion. As the opening of the contact hole 13 is positioned closer to edges, stress may be easily released from the edges so that crack will hardly be formed.

Because of the provision of the first shield film 11a beneath the thin-film transistor 30, it is possible to effectively prevent return light (or back light) from being incident on the channel region 1a' of the semiconductor layer 1a as well as its LDDS structure regions, namely, the low connection source region 1b and the low concentration drain region 1c. Since the present embodiment is designed such that the first shield film 11a is connected to the capacitance line 3b wired for its former or latter adjoining row of pixels, it is necessary to provide the capacitance line for supplying the constant potential to the first shield film 11a with respect to the uppermost or lowermost row of pixels. For this reason, the total number of capacitance lines is increased by one compared to the total number of tows of pixels or the total number of pixels vertically arranged on the screen of the display.

The opposite substrate 20 provides a second shield film 23 that is formed and arranged opposite to the foregoing regions forming the data line 6a, scan line 3a, and thin-film transistor 30 on the TFT array subsume 10 except the opening area of each pixel. Tn addition, the second shield film 23 is completely covered with a common electrode 21 that is formed on the entire surface area of the opposite substrate 20. Similar to the forgoing pixel electrode 9 formed on the TFT array substrate 10, the common electrode 21 is made by the transparent conductive film composed of the ITO or the like. Due to the provision of the second shield film 23, it is possible to prevent the incident light incoming from the opposite substrate 20 from being transmitted into the channel region 1a', low concentration source region 1b, and low concentration drain region 1c of the semiconductor layer 1a. In order to improve the contrast of the display, or in order to provide a color filter unction, the second shield film 23 provides a so-called 'black matrix' function for avoiding mixture of colors.

An orientation film 36 is formed above the pixel electrode 9 and the third-interlayer insulation film 7 on the TFT array substrate 10, while an orientation film 42 is formed beneath the common electrode 21 of the opposite substrate 20. Both the orientation films 36 and 42 are made of inorganic films composed of SiO or resin films composed of polyimide, for example. In addition, a liquid crystal composed of crystals of a positive dielectric anisotropy is narrowly held between the substrates 10 and 20. Since the present embodiment realizes the TN mode, a prescribed orientation process is effected in such a way that the orientation films 36 and 42 are twisted in their orientation directions with a twisting angle of 90°. FIG. 6 shows a prescribed relationship between orientations of the orientation films 36 and 42. That is, the orientation film 36 of the TFT array substrate 10 has an orientation direction 'Ra' (see solid-line arrow) whose angle is 0°, so that its orientation is directed from the left to the right along extending directions of the scan lines 3a. In contrast, the orientation film 42 of the opposite substrate 20 has an orientation direction 'Rb' (see dotted-line arrow) whose angle is 90°, so that its orientation is directed from the below to the above along extending directions of the data lines 6a.

As the orientation process, it is possible to employ various methods in response to types of the orientation films. In the case of the orientation film composed of SiO, for example, the slanted deposition is effected to form an SiO film so that the orientation direction for the orientation film can be controlled by an adequate selection of the deposition direction within the plane of the substrate, in other words, by an adequate selection of the directional range of atoms that move from the deposition source to the substrate. In the case of the orientation film composed of polyimide, the rubbing method may be used for the orientation process so that the orientation direction for the orientation film can be controlled by an adequate selection of the rubbing direction in which the polyamide film is nabbed by a rubbing cloth The liquid crystal display of the present embodiment is designed to perform the line inversion drive. In FIG. 6, the pixel electrodes 9 are divided into two groups in such a way that horizontally adjoining pixel electrodes which are aligned along one scan line 3a are selected for a first electrode group, while other horizontally adjoining pixel electrodes which are aligned along one scan line 3a and which also adjoin with the pixel electrodes of the first electrode group along the data lines 6a are selected for a second electrode group. Polarities of picture signals supplied to the pixel electrodes are alternately changed over in response to each of the frames. That is, in a certain frame, when picture signals of a positive (+) polarity are supplied to the pixel electrodes of the first electrode group, for example, picture signals of a negative (−) polarity are supplied to the pixel electrodes of the second electrode group. In the next frame, the polarities am changed over so that picture signals of a negative polarity are supplied to the pixel electrodes of the first electrode group while picture signals of a positive polarity are supplied to the pixel electrodes of the second electrode group. In short, picture signals of different polarities are respectively supplied to vertically adjoining pixel electrodes that are aligned along the data lines 6a and that belong to the first and second electrode groups respectively.

The liquid crystal display of the present embodiment provides the prescribed relationships between orientation directions of liquid-crystal molecules and polarities of picture signals supplied to the pixel electrodes 9 being driven, which is shown in FIG. 1B. That is, the direction of the lateral electric field that occurs in the power-on mode crosses at an approximately right angle with the orientation direction imparted to the TFT array substrate 10. Therefore, as described before with reference to the first basic configuration of this invention shown in FIG. 1B, an effecting direction of the lateral electric field crosses at an approximately right angle with a moving direction of a liquid-crystal molecule that is building up from the horizontally lying state (i.e., the parallel state with the substrate surface) to the vertically standing state; hence, the liquid-crystal molecule is hardly influenced by the lateral electric field. Thus, it is possible to reduce the occurrence of disinclination in the liquid crystal display of the present embodiment compared to the conventional liquid crystal display. As a result, it is possible to reduce the occurrence of display failures due to the disinclination In the conventional liquid crystal display, the 'initial' pre-tilt angle for the liquid-crystal molecule in the non-power mode is set to a certain range from 1° to 3°. Of course, the liquid crystal display of the present embodiment can use such a small range for the pre-tilt angle of the liquid-crystal molecule. However, when a larger pre-tilt angle approximately ranging from 3° to 30° is imparted to the liquid-crystal molecule, it can be said that the liquid-crystal molecule will be hardly influenced by the lateral electric field; therefore, it is possible to reduce the occurrence of disinclination further. Thus, it is preferable to impart a larger pre-tilt angle to the liquid-crystal molecule for the pinpose of a further improvement of the display quality. When the pretilt angle exceeds 30°, the light transmittance at the white display mode is reduced so that the display will be darkened. Therefore, it is unfavorable to increase the pretilt angle over 30°.

It is possible to provide various methods for increasing the pre-tilt angle in a larger range from 3° to 30° compared to the conventional range. One method that provides a superior controllability for the pre-tilt angle is the slanted deposition method in which slanted deposition is effected to form an inorganic material film on the TFT array substrate 10 as the foregoing orientation film 36. In this method, it is possible to control the pre-tilt angle by adjusting the deposition angle by which the slanted deposition is performed on the substrate surface. In order to effectively increase the pretilt angle, it may be necessary to perform slanted deposition multiple times while changing its deposition direction within the plane of the substrate That is, the slanted deposition is performed multiple times to form an orientation film corresponding to a mixture of pillar structures of inorganic materials inclined in one direction and other pillar structures of inorganic materials inclined in other directions.

Figures 9A, 9B, 9C, 9D:
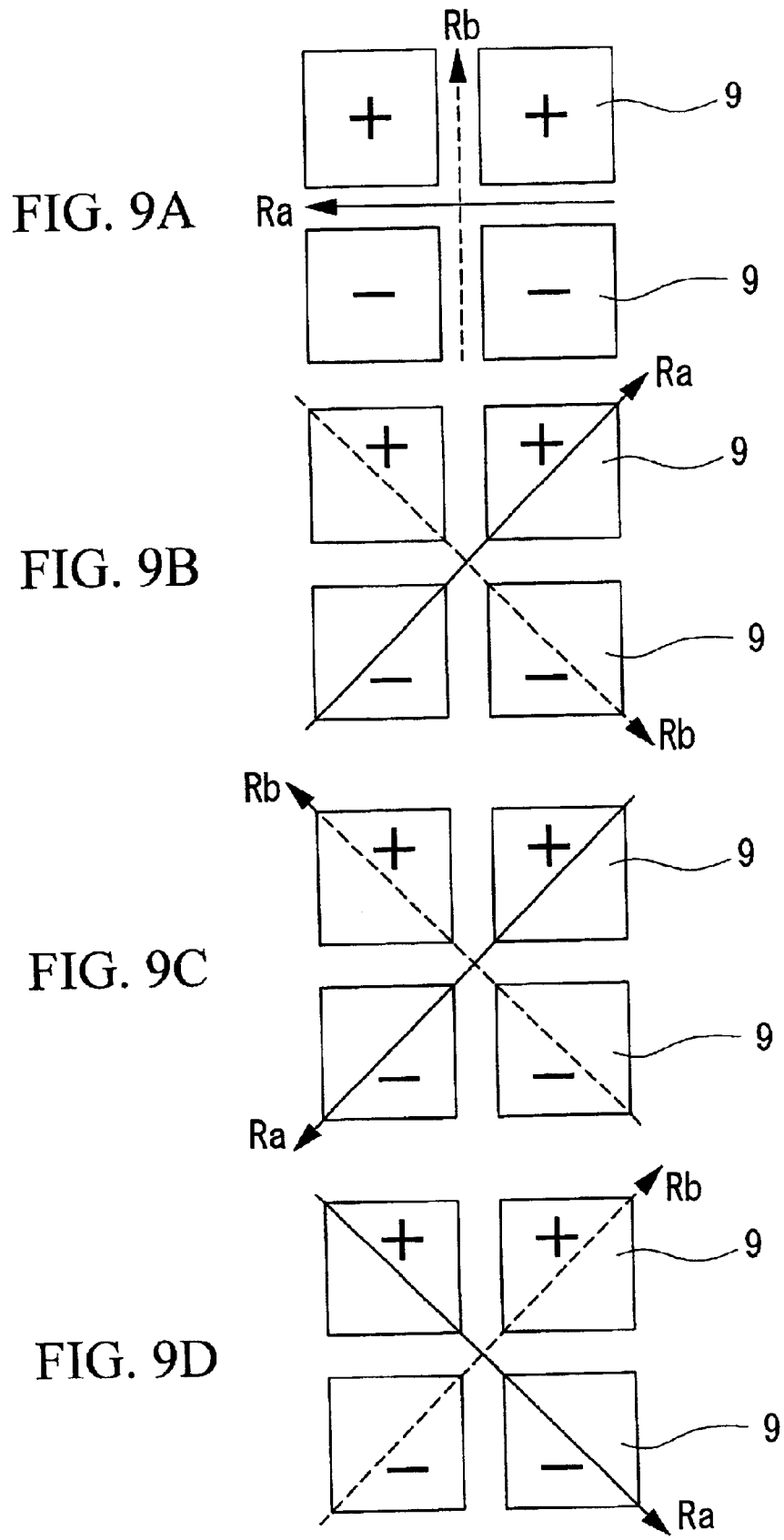
FIG. 9A shows an example of a combination of orientation directions imparted to orientation films formed on substrates.
FIG. 9B shows another example of the combination of orientation directions imparted to the orientation films formed on the substrates.
FIG. 9C shows a further example of the combination of orientation directions imparted to the orientation films formed on the substrates.
FIG. 9D shows a still further example of the combination of orientation directions imparted to the orientation films formed on the substrates.

In the present embodiment, an orientation process whose angle is 0° is performed with respect to the orientation film 36 formed on the TFT array substrate 10, and another orientation process whose angle is 90° is performed with respect to the orientation film 42 formed on the opposite substrate 20. Of course, this invention is not necessarily limited to such a combination of orientation directions; hence, it is possible to employ other combination of orientation directions, which will be described with reference to FIGS. 9A to 9D. That is, FIG. 9A shows that an orientation process whose angle is 180° is performed on the orientation film 36 for the TFT array substrate 10, and an orientation process whose angle is 90° is performed on the orientation film 42 for the opposite substrate 20. The orientation directions are not necessarily limited to the vertical and horizontal directions in the matrix arrangement of the pixel electrodes 9. That is, it is possible to provide an angle of 45° with respect to the alignment direction of the pixel electrodes 9 supplied with picture signals of the same polarity. FIG. 9B shows that an orientation process whose angle is 45° is performed on the orientation film 36 for the TFT array substrate 10, and an orientation process whose angle is 315° is performed on the orientation film 42 for the opposite substrate 20. FIG. 9C shows that an orientation process whose angle is 225° is performed on the orientation film 36 for the TFT array substrate 10, and an orientation process whose angle is 135° is performed on the orientation film 42 for the opposite substrate 20. FIG. 9D shows that an orientation process whose angle is 315° is performed on the orientation film 36 for the TFT array substrate 10, and an orientation process whose angle is 45° is performed on the orientation film 42 for the opposite substrate 20. By changing the combination of orientation directions respectively imparted to the orientation films 36 and 42 fir the TIT array substrate 10 and the opposite substrate 20, it is possible to adequately set a clear viewing direction for the user of the liquid crystal display. Incidentally, liquid-cystal molecules arranged between the TFT array substrate 10 and the opposite substrate 20 are twisted in the prescribed direction, which is either the clockwise direction or counterclockwise direction in plan view.

Since the present embodiment is designed as the liquid crystal display of the TN mode the twisting angle of liquid crystal molecules is set to 90°. Of course, this invention is not necessarily limited to the TN mode, so that the twisting angle of liquid-crystal molecules is not necessarily limited to 90°. If the twisting angle of liquid-crystal molecules is set to a certain angle other to 90°, it may be possible to provide a greater number of variations for the combination of orientation directions other than the aforementioned combinations of orientation directions. In this case, however, it is necessary to satisfy the following condition (1) or (2).

(1) The orientation direction imparted to the TFT array substrate 10 should be determined along with alignment directions of pixel electrodes 9 of the first and second electrode group, each of which is supplied with picture signals of the same polarity.

(2) One of the orientations of the orientation film 36 for the TFT array substrate 10 and the orientation of the orientation film 42 for the opposite substrate 20 should be directed towards the first electrode group region, while the other should be directed towards the second electrode group region.

Incidentally the present embodiments uses the rit angle or its half angle as the basis for determination of the orientation angles, which may be set to 0°, 45°, and 90°; for example. However, this invention allows a certain range of errors or margins corresponding to ±5° deviation from the aforementioned orientation angles. This is because in the actual manufacture of the liquid crystal display, variations within 5° or so may be estimated for the orientation angles due to positional deviations for the lamination of substrates (in particular; positional deviations within planes of substrates in their revolving directions) as well as angular deviations ceased by orientation processes such as the rubbing and slanted deposition.

The present embodiment describes the liquid crystal display operating with the line inversion drive in which picture signals of different polarities are respectively supplied to adjoining rows (or fines) of pixel electrodes horizontally aligned. Of course, this invention is applicable to the other liquid crystal displays operating with the column inversion drive. The column inversion dive revolves by 90° the lateral electric field and orientation in their directions compared to those of the line inversion drive. Therefore, the present embodiment can be easily modified to accommodate the column inversion drive, wherein it is possible to obtain the same operation and effect of the line inversion drive.

In the present embodiment the data line 6a, scan line 3a, and capacitance line 3b are formed at the peripheral portion of the pixel electrode 9, which is raised in height compared to the center portion, so that height differences are formed between the center portion and peripheral portion shown in FIG. 8. Even though the present embodiment can effectively reduce the occurrence of disinclination due to the lateral electric field, there remains a possibility that the disinclination may occur due to orientation failures at the height differences. By effecting a planarization process on the substrate surface with respect to the center portion and the peripheral portion forming the signal lines (e.g., 6a and 3a) and capacitance line 3b, it is possible to reduce the occurrence of orientation failures in orientation processes, Thus, it is possible to further reduce the occurrence of disinclination.

Figure 10:
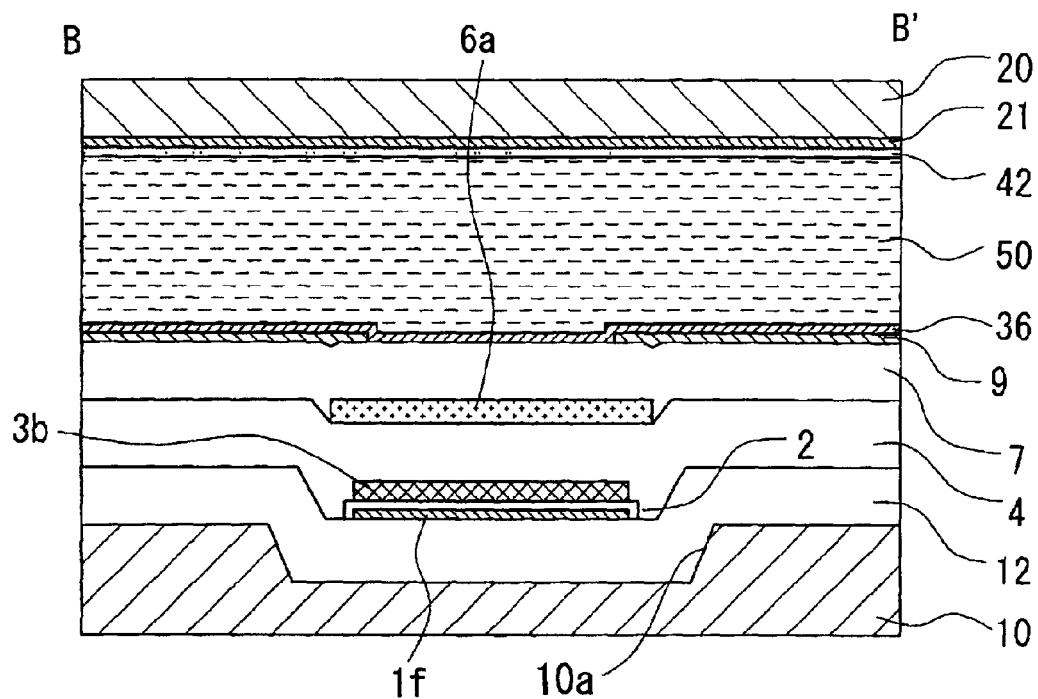
FIG. 10 is a cross-sectional view showing an example of the structure of the liquid crystal display of the first embodiment that is subjected to planarization processing.
Figure 11:
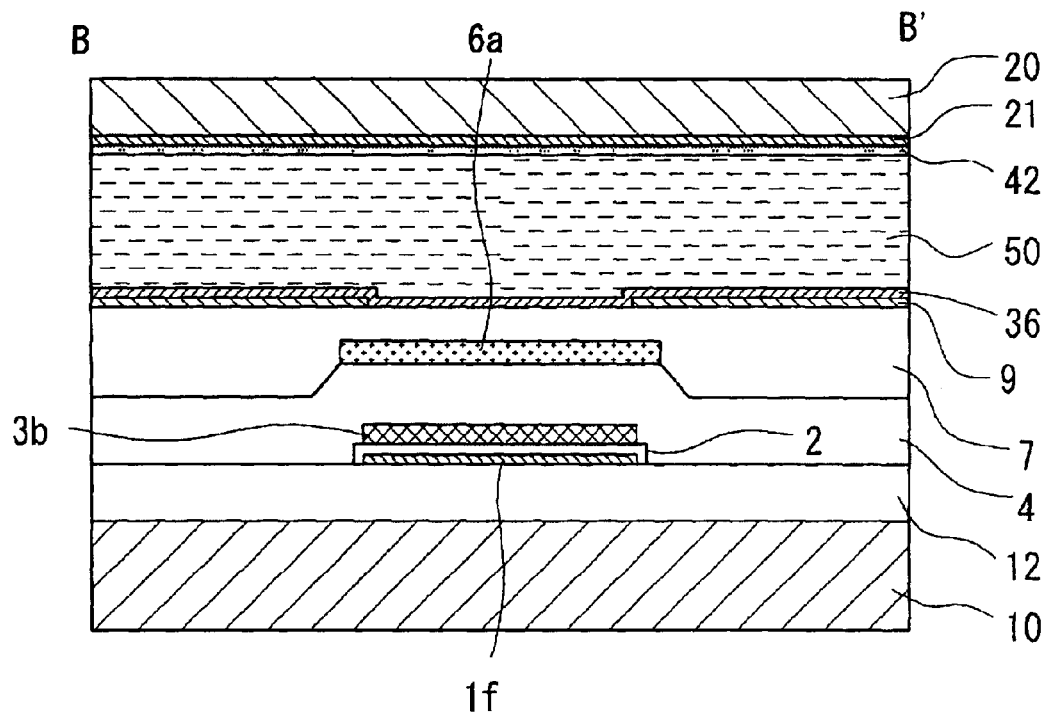
FIG. 11 is a cross-sectional view showing another example of the structure of the liquid crystal display of the first embodiment that is subjected to planarization processing.

Details of the planarization process will be discerned with reference to FIGS. 10 and 11. In FIG. 10, an etching process is dried on the transparent substrate so that a channel 10a having a prescribed depth is formed at the prescribed peripheral area used for the formation of the data line 6a and the capacitance line 3b in advance. By embedding the data line 6a and the capacitance line 3b in the channel 10a, it is possible to make the substrate surface (i.e., spice of the orientation film 36) substantially planer. Alternatively, in FIG. 11, the third-interlayer insulation film 7 covering the data line 6a and the capacitance line 3b is made thicker, and thereafter, the CMP method is used to polish the surface of the third-interlayer insulation film 7 to be planar; thus, it is possible to make the substrate surface (i.e., surface of the orientation film 36) planar. Incidentally, another method can be employed to realize the same structure shown in FIG. 11. That is, the third-interlayer insulation film 7 is formed using a boron phosphors silicate glass (abbreviated in 'BPS'), and thereafter, a beating process is effected on the BPSG film to reflow, so that the surface of the third-interlayer insulation film 7 is made planar, Alternatively, a 'spin on glass' (SOG) material having a high fluidity can be used to form the third-interlayer insulation film 7, so that the substrate surface can made more planar. It is necessary to perform the planarization process on the interlayer insulation film, which is not necessarily limited to the third-Interlayer insulation film 7. That is, the planarization process can be performed on the second-interlayer insulation film 4. Alternatively, it is possible to perform the planarization process on multiple interlayer insulation films.

In order to demonstrate the effects of the present embodiment, a variety of simulations were performed with respect to transmittances of liquid crystals while changing their orientation directions in relation to directions of lateral electric fields occurring on substrates. Results of the simulations will be described below.

Figure 12A:
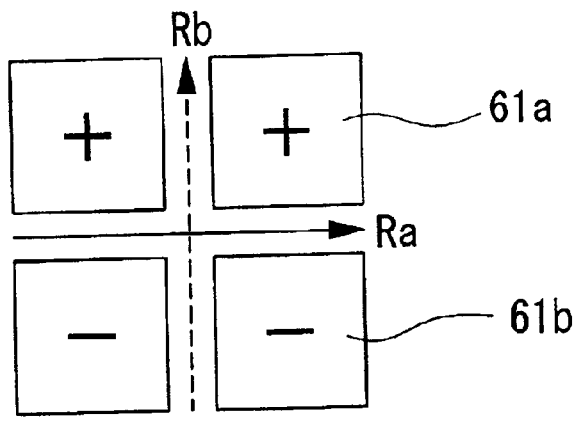
FIG. 12A diagrammatically shows a combination of orientation directions imparted to upper and lower substrates with respect to embodiment 1.
Figure 12B:
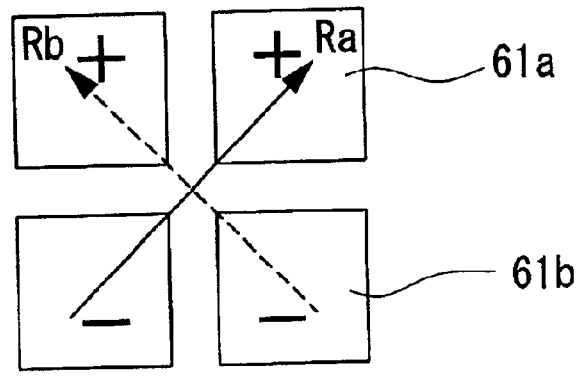
FIG. 12B diagrammatically shows a combination of orientation directions imparted to upper and lower substrates with respect to conventional art 2.
Figure 12C:
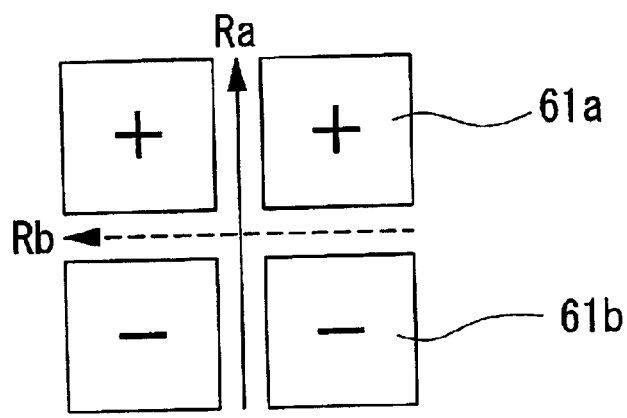
FIG. 12C diagrammatically shows a combination of orientation directions imparted to upper and lower substrates with respect to conventional art 1.
Figure 12D:
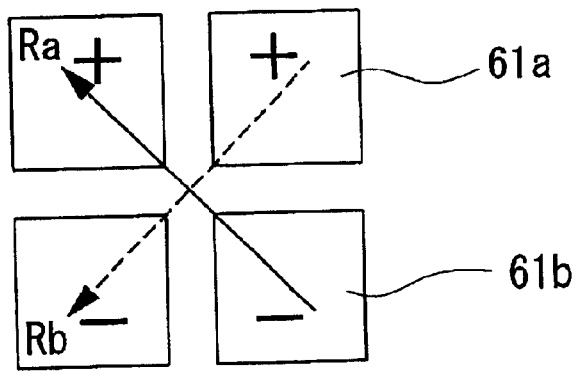
FIG. 12D diagrammatically shows a combination of orientation directions imparted to upper and lower substrates with respect to embodiment 2.
Figure 13A:
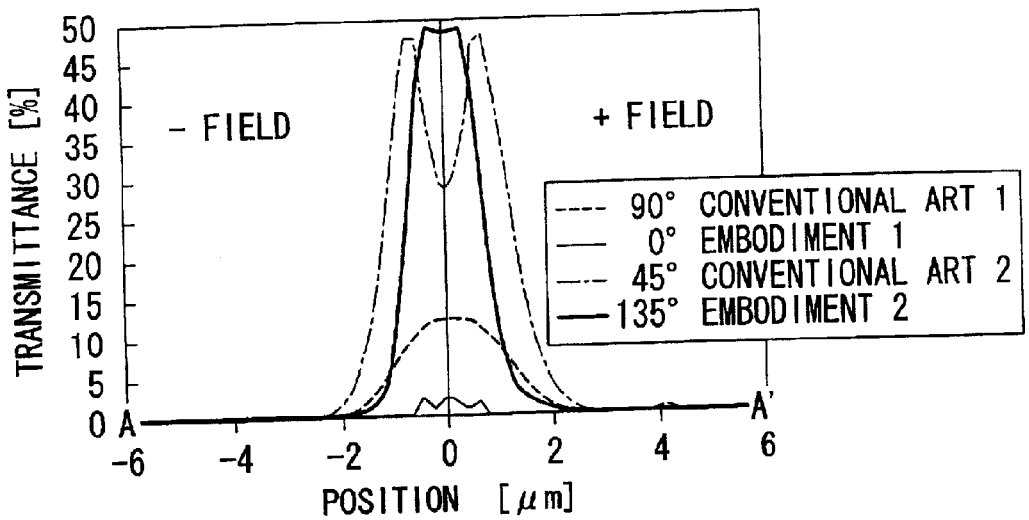
FIG. 13 A shows simulation results for transmittances of light transmitted through a liquid crystal whose pre-tilt angle is 3°.
FIG. 13B shows simulation results for transmittances of light transmitted through a liquid crystal whose pre-tilt angle is 15°.
FIG. 13C is a cross-sectional view showing a model of a liquid crystal display of a TN mode in which a liquid crystal is held between upper and lower substrates.
Figure 13B:
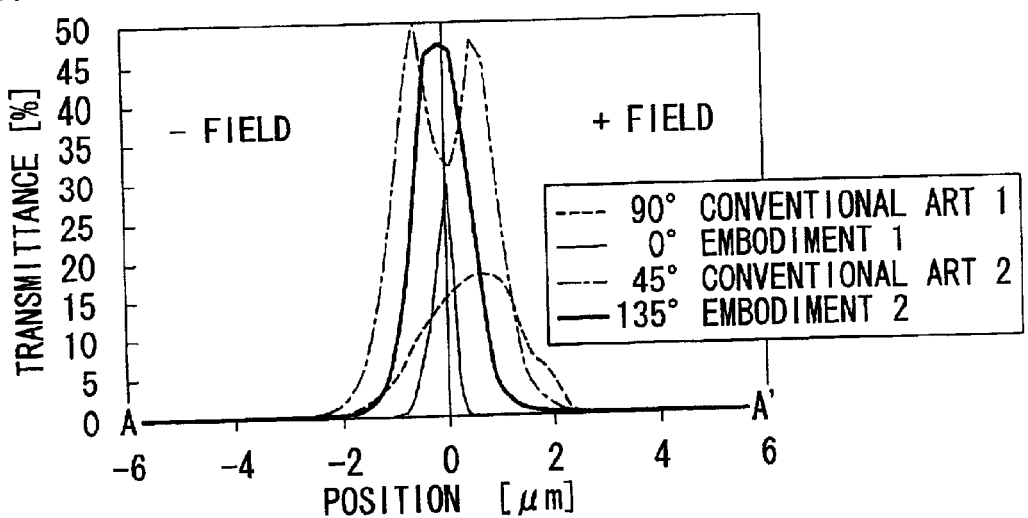
Figure 13C:
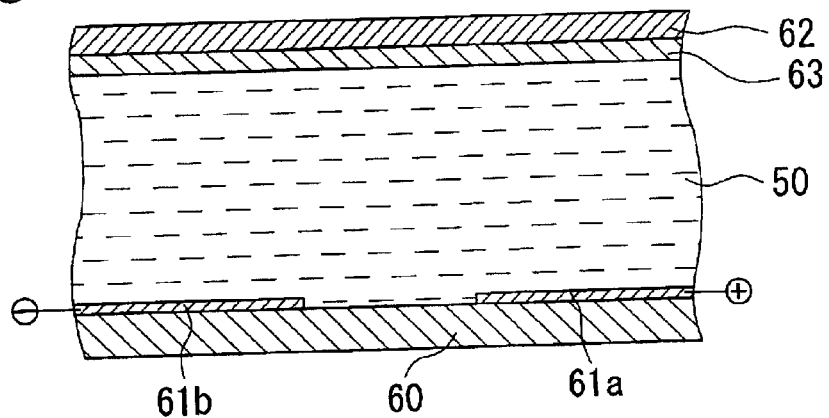

Simulations for transmittances of liquid crystals were performed using a model of a liquid crystal display of the TN mode shown in FIG. 13C, wherein a liquid crystal 50 is held between a lower substrate 60 and an upper substrate 62. Pixel electrodes 61a and 61b both having planar surfaces are arranged on the lower substrate 60, while a common electrode 63 is arranged beneath the upper substrate 62, The simulations are performed by applying a positive potential (+) to the pixel electrode 61a while applying a negative potential (−) to the pixel electrode 61b. That is, the model of FIG. 13C is used to perform simulations with respect to four cases shown in FIGS. 12A to 12D. The simulations are performed in the prescribed conditions or dimension that the interval of distance between the pixel electrodes 61a and 61b is 1 μm, the cell gap is 3 μm, and the effective voltage applied to the liquid crystal 50 is 5 V FIGS. 12A to 12D show different combinations of orientation directions, wherein reference symbol 'Ra' designates an orientation direction imparted to the lower substrate 60, and 'Rb' designates an orientation direction imparted to the upper substrate 62. Namely, FIG. 12A shows 'embodiment 1' in which Ra is 0°, and Rb is 90°; FIG. 12B shows 'conventional art 2' in which Ra is 45°, and Rb is 135°; FIG. 12C shows 'conventional art 1' in which Ra is 90°, and Rb is 180°; and FIG. 12D shows 'embodiment 2' in which Ra is 135°, and Rb is 225°.

The simulation results are shown in FIGS. 13A and 13B. Specifically, FIG. 13A shows simulation results with respect to the pre-tilt angle of 3° imparted to liquid-crystal molecules, and FIG. 13B shows simulation results with respect to the pre-tilt angle of 15° imparted to liquid-crystal molecules. The horizontal axis in FIGS. 3A and 13B represents the position [μm] deviated in the horizontal direction from the prescribed origin corresponding to a midpoint of the interval between the adjoining pixel electrodes 61a and 61b, while the vertical axis represents the transmittance [%] of light transmitting through the liquid crystal 50. Incidentally, the simulation results of FIGS. 13A and 13B are produced in relation to the 'black' display; hence the peak region of the light transmittance indicates the occurrence of disinclination. Therefore it is possible to read from the graphs of FIGS. 13A and 13B that a leakage of light may occur at the position corresponding to the peak region of the light transmittance In FIG. 13A showing simulation results with respect to the pretilt angle of 3°, the conventional art 1 provides a peak of the light transmittance whose width ranges ±2.2 μm, while the embodiment 1 provides peaks of the light transmittance whose total width ranges only ±0.8 μm. In addition, the conventional art 2 provides peaks of the light transmittance whose total width ranges ±2.5 μm, while the embodiment 2 provides a peak of the light transmittance whose width ranges only 2.0 μm. FIG. 13A shows that the peak width of the light transmittance is noticeably reduced in both the embodiment 1 and embodiment 2 compared to the conventional art 1 and conventional art 2. This indicates that areas of discretion can be noticeably reduced in the embodiments compared to the conventional arts. Similar simulation results are shown in FIG. 13B in which the pre-tilt angle is set to 15°.

Comparing between peaks of the embodiment 1 shown in FIGS. 13A and 13B, it can be said that the pre-tilt angle of 15° provides a smaller peak width compared to the pre-tilt angle of 3°. Comparing between peaks of the embodiment 2 shown in FIGS. 13A and 13B, it can also be said that the pre-tilt angle of 15° provides a smaller peak width compared to the pre-tilt angle of 3°. That is, by increasing the pre-tilt angle imparted to liquid-crystal molecules, it is possible to reduce areas of disinclination, which can be proved by a comparison between FIGS. 13A and 13B.

Second Embodiment

Next an active-matrix liquid crystal display will be described in accordance with a second embodiment of the invention The liquid crystal display of the second embodiment is constructed similarly to the foregoing first embodiment shown in FIGS. 5 to 8; hence, the duplicate description will be omitted.

In the second embodiment (see FIG. 7), the uppermost surface of the TFT array substrate 10 corresponds to the surface of the pixel electrode 9 that covers the prescribed area of the third-interlayer insulation film 7 as well as the surface of the third-interlayer insulation film 7 that is not covered with the layer of the pixel electrode 9. On the uppermost surface of the TFT array substrate 10, an inorganic orientation film 36 is formed by the slanted deposition method using the inorganic material such as a silicon oxide. The inorganic orientation film 36 is composed of at least one kind of pillar structure in which the pillars are arranged and inclined in the specific direction. In addition, an organic orientation film 42 composed of orientational high molecules of a polyimide is formed on the lowermost surface of the opposite substrate 20 that is covered with the common electrode 21. A rubbing process is performed on the surface of the organic orientation film 42, which is rubbed in a certain direction by the rubbing cloth. A liquid crystal 50 having a positive dielectric anisotropy is held between the TFT array substrate 10 and the opposite substrate 20, specifically, between the orientation films 36 and 42.

FIG. 7 shows that a relatively large number of layers are formed on the in TFT army substrate 10, wherein the inorganic orientation film 36 is formed on the pixel electrode 9 and the third-interlayer insulation film 7 that provide a relatively large number of differences in height. In FIG. 7, reference numeral 81 designates a pixel peripheral portion in which the data line 6a, scan line 3a, capacitance line 3b, thin-film transistor 30, and first shield film 11a are formed on the surface of the bed (i.e., pixel electrode 9 and third-interlayer insulation film 7) used for the formation of the inorganic orientation film 36, and reference numeral 82 designates a pixel center portion in which the pixel electrode 9 is formed and which does not contain the area of the capacitance line 3b. A greater number of layers are formed in the pixel peripheral portion 81 compared to the pixel center portion 82. For this reason, a relatively large difference 80 is formed between the pixel peripheral portion 81 and the pixel center portion 82.

The height of the difference 80 ranges from approximately 200 nm to 1000 nm, for example. Such a large difference 80 may not be negligible in comparison with the thickness of the inorganic orientation film 36 that ranges from 5 nm to 50 nm, for example. Recently, as the liquid crystal displays are manufactured with a very fine structure is required to reduce pitches between pixels and increase the total number of pixels on the screen. This leads to an increase of the ratio of the difference 80 against the total area of the pixel on the TFT array substrate 10.

If an organic orientation film is formed on the source of the TFT array substrate having many differences, a rubbing process will fail when the rubbing cloth is not brought into contact with the neighboring area of the difference 80. That is, it is very difficult to completely perform the rubbing process over the entire surface area of the 'organic' orientation film formed on the TFT array substrate. This may cause orientation failures and display failure.

The present embodiment eliminates the necessity of performing the rubbing process with respect to the TFT array substrate 10 having many differences. That is, the present embodiment employs the inorganic orientation film 36 which can grow without being influenced by the difference 80 compared to the organic orientation film. Therefore, it is possible to make the orientation film 36 without defects. Thus, it is possible to reduce the occurrence of display failures due to defects of the orientation film.

If the formation of the inorganic orientation film 36 is implemented only by a single stage of slanted deposition, the difference (e.g., 80) of the bed may produce a shadow in response to the height of the difference and the deposition direction. That is, only a single stage of slanted deposition may produce a deposition-incomplete area in which an inorganic material is not completely deposited. Therefore, a defect may be formed on the orientation film due to the shadow of the difference.

In order to avoid the incomplete deposition, it is preferable to perform the slanted deposition in multiple directions on the TFT array substrate 10 in plan view. By performing the slanted deposition multiple times it is possible to form the inorganic orientation film 36 having no defect regardless of the height of the difference formed on the bed and the deposition directions. Therefore, it is possible to reduce the occurrence of disinclination in the non-power mode due to the defects of the orientation film.

Figure 14:
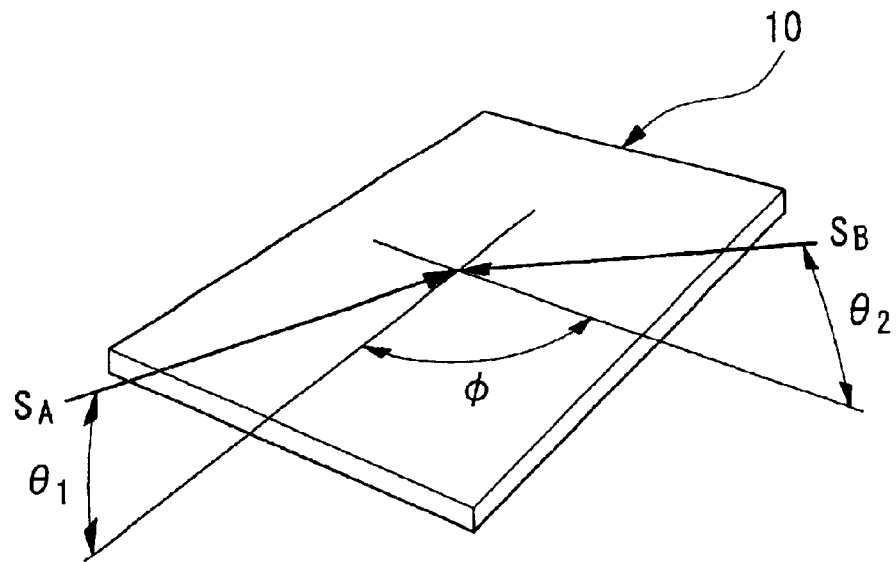
FIG. 14 is a simplified perspective view showing different directions for effecting slanted deposition with respect to the TFT array substrate.

As described above, the present embodiment provides multiple stages of the slanted deposition. For example, the inorganic orientation film 36 is formed by two stages of the slanted deposition, which will be described with reference to FIG. 14.

Specifically, a first stage of the slanted deposition is performed in a deposition direction $S_A$ corresponding to a deposition angle $\theta_1$ that is formed above the surface of the TFT array substrate 10; and a second stag of the slanted deposition is performed in a deposition direction $S_B$ corresponding to a deposition angle $\theta_2$ that is formed above the surface of the TFT array substrate 10, wherein the deposition direction $S_n$ separates from the deposition direction $S_A$ by an angle $\Phi$ on the TFT array substrate 10 in its plan view. Thus, the second stage of the slanted deposition reliably deposits the inorganic material in the deposition-incomplete area that occurs in the first stage of the slanted deposition due to the shadow of the difference. Incidentally, it is preferable to increase the deposition angle $\theta_2$ to be larger than the deposition angle $\theta_1$.

In the second stage of the slanted deposition, the inorganic material is deposited in the neighboring area of the difference, in which the slanted deposition is incompletely performed in the stage, as well as the other areas in which the slanted deposition is completely performed in the first stage Of course, there is a possibility that the second stage of the slanted deposition may produce another shadow of the differences in response to the deposition direction $S_n$. For this reason, the inorganic orientation film 36 that is formed by the two stages of the slanted deposition provides the following three regions.

(i) A first region that contains pillar structures created by the first stage of the slanted deposition only.

(ii) A second region that contains pillar structures created by the second stage of the slanted deposition only.

(iii) A third region that contains mires of pillar structures respectively created by the first and second stages of the slanted deposition.

In the plan view of the TFT array substrate 10, there are provided mixtures of multiple types of pillar structures, which may be slanted in different directions.

Compared with the TFT array substrate 10, the opposite substrate 20 provides a relatively small number of layers. That is, the common electrode 21 and the second shield film 23 are only arranged between the opposite substrate 20 and the organic orientation film 42. Therefore, the organic orientation film 42 is formed on the bed (i.e., common electrode 21) having few differences. Since the opposite substrate 20 has few differences, it is possible to perform a rubbing process completely over the entire surface area of the organic orientation film 42. Compared with the inorganic orientation film 36, the organic orientation film 42 can be produced at a relatively low cost and is superior in productivity. Therefore, it is possible to noticeably reduce the production cost with respect to the present embodiment, which forms the inorganic orientation film 36 only on the ITT array substrate 10, compared to the existing product in which inorganic orientation films are formed on both substrates. In addition, it is possible to avoid unwanted reduction of the productivity in the present embodiment compared to the existing product.

Next, a description will be given with respect to orientation processes that are performed on the inorganic orientation film 36 and the organic orientation film 42 respectively.

In order to realize the TN mode, the liquid crystal display of the present embodiment is designed in such a way that orientation processes are performed so as to establish a 'twisted' relationship between the inorganic orientation film 36 and the organic orientation film 42, orientation directions of which differ from each other by 90°. FIG. 6 shows that an orientation process is performed to provide the inorganic orientation film 36 with an orientation direction Ra directing from the left to the right along the extending direction of the scan line 3a, while an orientation process is performed to provide the organic orientation film 42 with an orientation direction Rb directing from the below to the above along the extending direction of the data line 6a

In addition, the orientation processes are performed to increase the pre-tilt angle for liquid-crystal molecules lying in proximity to the TFT array substrate 10 to be larger than the pre-tilt angle for liquid-crystal molecules lying in proximity to the opposite substrate 20 in the non-power mode. That is, the orientation processes are performed in such a way that the pre-tilt angle realized by the inorganic orientation film 36 becomes greater than the pre-tilt angle realized by the organic orientation film 42 in the non-power mode. Specifically, it is preferable to set the pre-tilt angle for liquid-crystal molecules lying in proximity to the TFT array substrate 10 in a range from 3° to 30°, and it is preferable to regulate the pro-tilt angle for liquid-crystal molecules lying in proximity to the opposite substrate 20 in a range from 1° to 3°, for example. When the pre-tilt angle for liquid-crystal molecules lying in proximity to the TFT array substrate 10 exceeds 3° in the non-power mode, the light transmittance decreases in the white display mode, which causes unpleasant darkening of the display screen.

The organic orientation film 42 can be controlled in the orientation direction and pre-tilt angle by controlling the rubbing direction of the rubbing process therefor.

In contrast, the inorganic orientation film 36 can be controlled in the surface shape by controlling the deposition direction of the deposition therefor, so that the desired orientation direction and desired pre-tilt angle can be obtained therefor. The slanted deposition provides an inorganic orientation film with a higher pre-tilt angle in a sable manner compared to the pre-tilt angle imparted to the organic orientation film composed of orientational high molecules.

The orientation direction and the pre-tilt angle applied to the inorganic orientation film 36 depends upon pitches and sizes of pillar structures. When the inorganic orientation film 36 is formed by only a single stage of slanted deposition, its orientation direction and pre-tilt angle substantially match the inclination direction and inclination angle of the pillar structures created therein. In contrast when the inorganic orientation film 36 is formed by multiple stages of slanted deposition, it contains mixtures of multiple types of pillar structures; hence there are provided distributions for orientation directions and pre-tilt angles applied to the inorganic orientation film 36. However, it was generally observed that pillar structures created by the second stage or latter stages of the slanted deposition are formed to occupy gaps between pillar structures that were created by the first stage of the slanted deposition. Hence, the inorganic orientation film 36 provides an overall orientation direction and an overall pre-tilt angle on average, which are substantially regulated by the surface shapes of the pillar structures created by the first stage of the slanted deposition As described above, the present embodiment performs orientation processes on the inorganic orientation film 36 and the organic orientation film 42 respectively in such a way that the pre-tilt angle for liquid-crystal molecules lying in proximity to the TFT array substrate 10 becomes larger than the pre-tilt angle for liquid-crystal molecules lying in proximity to the opposite substrate 20 at the non-power mode. Hence, even though the liquid crystal display employs the line inversion drive and column inversion drive, it is possible to reduce the occurrence of disinclination due to the lateral electric field, which is generated in proximity to the TFT array substrate 10 at the power-on mode in addition to the vertical electric field that directly contributes to driving the liquid crystal.

Figure 15:
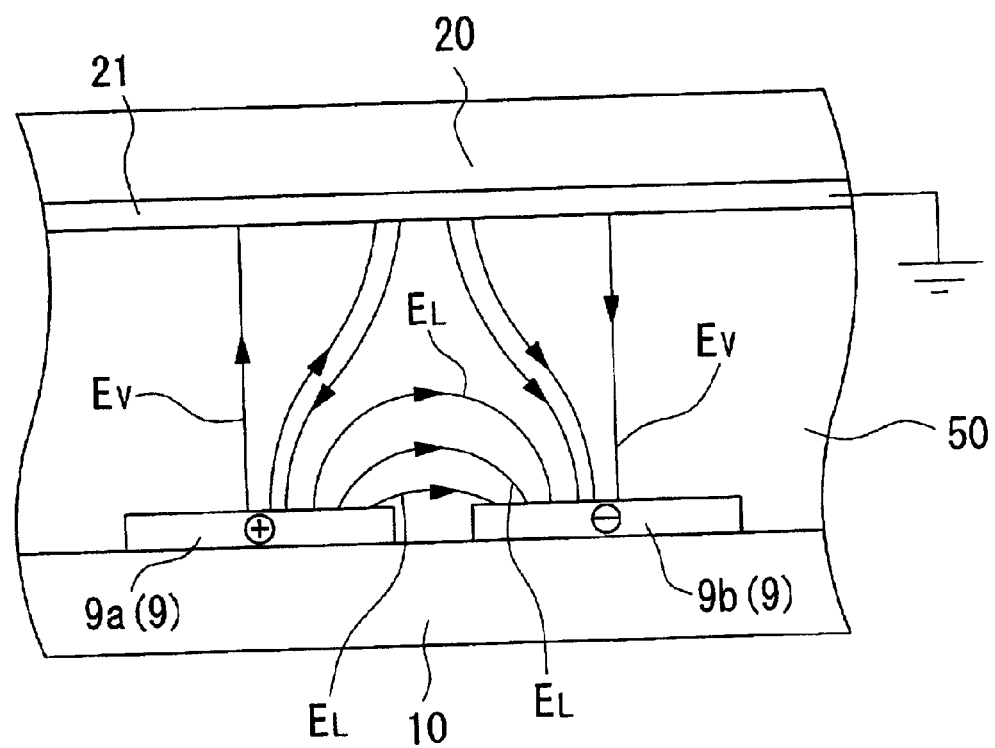
FIG. 15 is a simplified cross-sectional view showing a model of the liquid crystal display of the second embodiment in which electric fields occur in response to line inversion drive.

With reference to FIG. 15, a desorption will be given with respect to electric fields that occur in the liquid crystal 50 at the power-on mode in response to the line inversion drive. FIG. 1 shows a simplified cross-sectional view showing a model of the liquid crystal display of the present embodiment in which electric fields are generated in the liquid crystal 50 in response to prescribed voltages applied to the pixel electrodes 9 and the common electrode 21 respectively. Specifically, the pixel electrode 9a belongs to the first electrode group charged at a positive potential, while the pixel electrode 9b belongs to the second electrode group charged at a negative potential. The ground potential is applied to the common electrode 21.

In FIG. 15, a vertical electric field EV occurs in a direction from the center portion of the pixel electrode 9a to the common electrode 21 in relation to the first electrode group, and a vertical electric field EV occur in a direction from the common electrode 21 to the center portion of the pixel electrode 9b in relation to the second electrode group These vertical electric fields EV directly continue to driving the liquid crystal 50.

On the TFT array substrate 10, potentials having different polarities are respectively applied to the pixel electrode 9a of the first electrode group and the 'adjoining' pixel electrode 9b of the second electrode group. This causes a lateral electric field EL in a direction from the pixel electrode 9a to the adjoining pixel electrode 9b. The lateral electric field EL is not generated for the purpose of driving the liquid crystal 50. Actually, it occurs naturally in the power-on mode.

The present embodiment is designed in such a way that in the non-power mode, the pre-tilt angle for liquid-crystal molecules lying in proximity to the TFT array substrate 10 becomes larger than the pre-tilt angle for liquid-crystal molecules lying in proximity to the opposite substrate 20. Therefore, in the non-power mode, liquid-crystal molecules lying in proximity to the TFT array substrate 10 are oriented so that long-axis directions thereof are forced to be close to directions of vertical electric fields $EV_1$ which will be generated in the power-on mode and directly contribute to driving the liquid crystal 50. Even though the lateral electric field EL occurs between the pixel electrode 9a and the adjoining pixel electrode 9b, it is possible to smoothly change over an orientation of liquid-crystal molecules such that they are forced to be aligned along the vertical electric fields EV. Thus, it is possible to reduce the occurrence of disinclination due to the lateral electric field EL in the power-on mode.

The present embodiment describes that many differences are formed on the surface of the bed used for the formation of the inorganic orientation film 36 on the TFT array substrate 10. Of course, this invention is not necessary to the present embodiment; hence, it is possible to form the inorganic orientation film 36 on the 'planar' surface of the bed that is subjected to planarization. In this case, the inorganic orientation film 36 can be completely formed without defects by a single stage of slanted deposition.

Incidentally, this invention is not necessarily limited to the aforementioned liquid crystal having a positive dielectric anisotropy; therefore, it can be applied to the liquid crystal having a negative dielectric anisotropy that is used in the vertical orientation mode and the like.

Electronic Devices

Next, examples of electronic devices using the aforementioned liquid crystal display will be described with reference to FIGS. 16 to 19.

Figure 16:
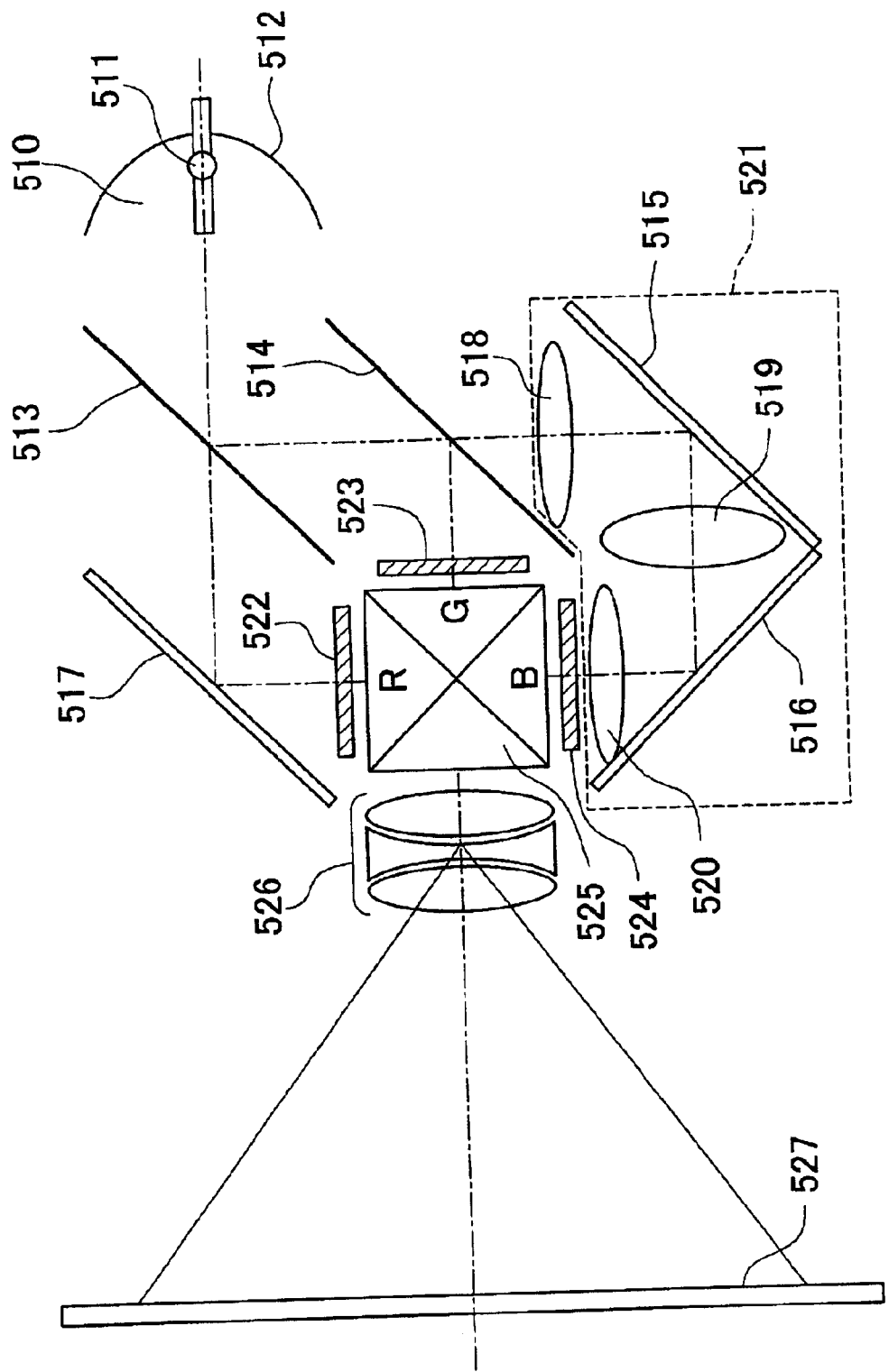
FIG. 16 shows an outline configuration of a liquid crystal display projector using liquid crystal light valves.

FIG. 16 shows an outline configuration of a liquid crystal display projector of the so-called 'three board type' that uses three liquid crystal light valves. The liquid crystal display of the foregoing embodiments is used for each of the liquid crystal light valves. In FIG. 16, reference numeral 510 designates a light source; reference numerals 513 and 514 designate diachronic mirrors; reference numerals 515, 516, and 517 designate reflecting mirrors; reference numerals 518, 519, and 520 designate relay lenses; reference numerals 522, 523, and 524 designate liquid crystal light valves; reference numeral 525 designates a cross diachronic prism; and reference numeral 526 designates a projecting lens system)

The light source 510 is composed of a lamp 511 such as a metal halide lamp, and a reflector 512 for reflecting light of the lamp 511. The diachronic mirror 513 is designed to reflect blue and green light. Hence, the diachronic mirror 513 transmits only the red light in the white light emitted from the light source 510 while avoiding transmission of the blue and green light therethrough. The red light transmitted through the diachronic mirror 513 is reflected by the reflecting mirror 517 and is then incident on the liquid crystal lift valve 522, which is exclusively used for the projection of red light.

Within color components of light reflected by the diachronic mirror 513, the green light is reflected by the diachronic mirror 514 exclusively used for reflection of green lid and it is then incident on the liquid crystal light valve 523, which is exclusively used for the projection of green light. The 'remaining' blue light is transmitted through the 'second' diachronic mirror 514 as well. A light guide unit 521 is provided to compensate for differences of optical path lengths with respect to the blue light compared to the green light and red light. The light guide unit 521 is a relay lens system that contains an incoming lens 519, a relay lens 519, and an outgoing lens 520. Therefore, the blue light is relayed and guided by the light guide unit 521; then, it is incident on the liquid crystal light valve 524 that is exclusively used for the projection of blue light.

The liquid crystal light valves 522, 523, and 524 modulate the red light, green light, and blue light respectively. Modulated light beams are incident on the cross diachronic prism 525 in which four rectangular prisms are laminated. Herein, dielectric multilayer films for reflecting red light and blue light respectively are combined together in a cross shape, which is arranged on an interior plane of the cross diachronic prism 525. These dielectric multilayer films provide composition of three colors of light; hence, it is possible to produce light beams representing color images. Composed light is projected on a screen 527 by the projecting lens system 526 that is a projecting light system. Thus, color images are adequately magnified and arm displayed on the screen 527.

Since the aforementioned liquid crystal display projector of FIG. 16 is constructed using the liquid crystal displays of the foregoing embodiments as the liquid crystal light valves, it is possible to produce color images having a high quality.

Figure 17:
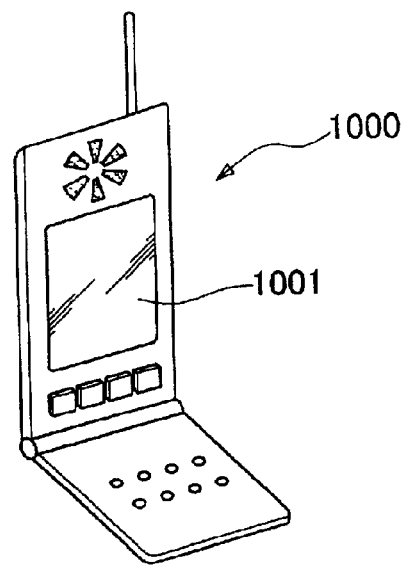
FIG. 17 is a perspective view showing an appearance of a cellular phone using a liquid crystal display.

FIG. 17 shows a cellular phone 1000 having a liquid crystal display 1001, which corresponds to the liquid crystal display of the foregoing embodiments.

Figure 18:
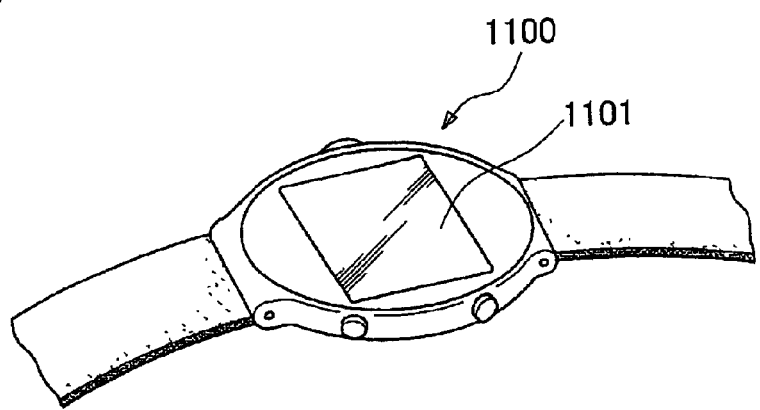
FIG. 18 is a perspective view showing an appearance of a wristwatch using a liquid crystal display.

FIG. 18 shows a wristwatch 1100 having a liquid crystal display 1101, which corresponds to the liquid crystal display of the foregoing embodiments.

Figure 19:
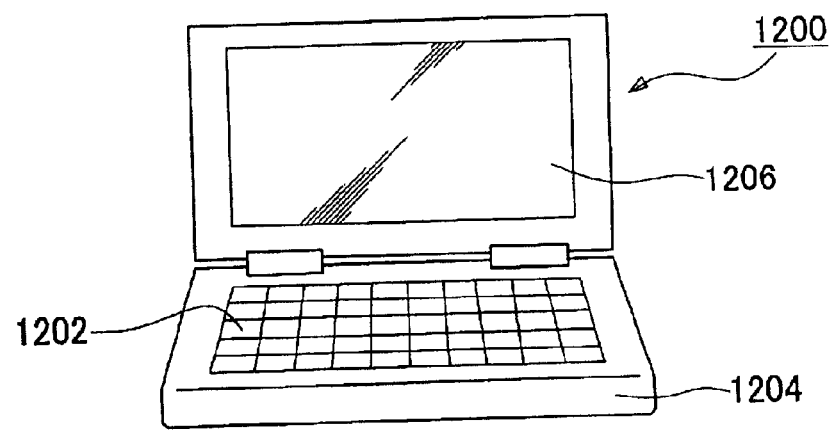
FIG. 19 is a front view showing a personal computer using a liquid crystal display.

FIG. 19 shows a portable information processing device 1200 such as a word processor and a personal computer (e g., a laptop or notebook computer). This device 1200 is basically constructed by a manual input section 1202 such as a keyboard, a casing 1204 containing electronic components, and a liquid crystal display 1206, which corresponds to the liquid crystal display of the foregoing embodiments.

All of the aforementioned electric devices shown in FIGS. 16 to 19 provide the liquid crystal displays of the foregoing embodiments; hence, they can clearly display pictures having a high quality on the screen. Incidentally, the applied fields of this invention are not necessarily limited to the aforementioned electronic devices; hence, this invention can be widely used for a variety of fields.

As this invention may be embodied in several forms without departing from the spirit or essential characteristics thereof, the present embodiments are therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. An active-matrix liquid crystal display in which a liquid crystal layer is held between an active matrix substrate and an opposite substrate, comprising:

a first group of pixel electrodes that are aligned in a prescribed direction on the active matrix substrate and that are supplied with picture signals of a first polarity; and a second group of pixel electrodes that are aligned to adjoin with the first group of pixel electrodes respectively and that are supplied with picture signals of a second polarity, wherein within the liquid crystal layer, liquid-crystal molecules lying in proximity to the active matrix substrate are initially subjected to a prescribed orientation in a non-power mode so that long-axis directions thereof substantially match alignment directions of the first and second groups of pixel electrodes respectively.

2. An active-matrix liquid crystal display according to claim 1, wherein a pre-tilt angle ranging from 3° to 30° is imparted to liquid-crystal molecules lying in proximity to the active matrix substrate.

3. An active-matrix liquid crystal display according to claim 1, wherein a pre-tilt angle ranging from 3° to 30° is imparted to liquid-crystal molecules lying in proximity to the active matrix substrate by forming pillar structures that are made of an inorganic material and are slanted in a specific direction on the active matrix substrate.

4. An active-matrix liquid crystal display according to claim 1, wherein a pre-tilt angle ranging from 3° to 30° is imparted to liquid-crystal molecules lying in proximity to the active matrix substrate by forming mixtures of first and second pillar structures that are made of an inorganic material and are respectively slanted in different directions in plan view on the active matrix substrate.

5. An active-matrix liquid crystal display according to claim 1, wherein a planarization process is performed on prescribed regions for wiring signal lines driving the pixel electrodes and other regions for arranging the pixel electrodes on the active matrix substrate.

6. An active-matrix liquid crystal display in which a liquid crystal layer is held between an active matrix substrate and an opposite substrate, comprising:
   a first group of pixel electrodes that are aligned in a prescribed direction on the active matrix substrate and that are supplied with picture signals of a first polarity; and
   a second group of pixel electrodes that are aligned to adjoin with the first group of pixel electrodes respectively and that are supplied with picture signals of a second polarity,
   wherein within the liquid crystal layer, liquid-crystal molecules lying in proximity to the active matrix substrate are initially subjected to an orientation providing a prescribed orientation direction in a non-power mode so that the long-axis directions thereof are slanted with respect to alignment directions of the first and second groups of pixel electrodes respectively, and they are also twisted to lie across the first and second groups of pixel electrodes respectively in plan view when being extended from the active-matrix substrate to the opposite substrate.

7. An active-matrix liquid crystal display according to claim 6, wherein the orientation direction is slanted by an angle of about 45° against the alignment directions of the first and second groups of pixel electrodes.

8. An active-matrix liquid crystal display in which a liquid crystal layer is held between an active matrix substrate and an opposite substrate, comprising:
   a first group of pixel electrodes that are aligned in a prescribed direction on the active matrix substrate and that are supplied with picture signals of a first polarity;
   a second group of pixel electrodes that are aligned to adjoin with the first group of pixel electrodes respectively and that are supplied with picture signals of a second polarity;
   a first orientation film that is formed on a surface of the active matrix substrate by effecting an orientation process in a first orientation direction (Ra) that is slanted with respect to alignment directions of the first and second groups of pixel electrodes; and
   a second orientation film that is formed on a surface of the opposite substrate by effecting an orientation process in a second orientation direction (Rb) that is slanted with respect to the alignment directions of the first and second groups of pixel electrodes,
   wherein one of the first and second orientation directions is directed towards the first group of pixel electrodes in plan view, while the other is directed towards the second group of pixel electrodes in plan view.

9. An electronic device having an active-matrix liquid crystal display comprising:
   an active matrix substrate for fabricating a first group of pixel electrodes that are aligned in a prescribed direction and are supplied with picture signals of a first polarity, and a second group of pixel electrodes that are aligned to adjoin with the first group of pixel electrodes respectively and are supplied with picture signals of a second polarity;
   an opposite substrate that is arranged oppositely to the active matrix substrate;
   a liquid crystal layer having a positive dielectric anisotropy that is held between the active matrix substrate and the opposite substrate; and
   a first orientation film that is formed on a surface of the active matrix substrate by effecting an orientation process in a first orientation direction (Ra) in relation to alignment directions of the first and second groups of pixel electrodes, so that a pre-tilt angle ranging from 3° to 30° is imparted to liquid-crystal molecules lying in proximity to the active matrix substrate;
   a second orientation film (42) that is formed on a surface of the opposite substrate by effecting an orientation process in a second orientation direction (Rb) that crosses with the first orientation direction with a right angle therebetween, wherein the first and second orientation direction are respectively slanted by an angle of about 45° against the alignment directions of the first and second groups of pixel electrodes, and wherein one of the first and second orientation directions is directed towards the first group of pixel electrodes in plan view, while the other is directed towards the second group of pixel electrodes in plan view.

10. An electronic device having an active-matrix liquid crystal display comprising:
   an active matrix substrate for fabricating a first group of pixel electrodes that are aligned in a prescribed direction and are supplied with picture signals of a first polarity, and a second group of pixel electrodes that are aligned to adjoin with the first group of pixel electrodes respectively and are supplied with picture signals of a second polarity;
   an opposite substrate that is arranged oppositely to the active matrix substrate; a liquid crystal layer having a positive dielectric anisotropy that is held between the active matrix substrate and the opposite substrate; and
   a first orientation film that is formed on a surface of the active matrix substrate by effecting an orientation process in a first orientation direction (Ra) in relation to alignment directions of the first and second groups of pixel electrodes, so that a pre-tilt angle ranging from 3° to 30° is imparted to liquid-crystal molecules lying in proximity to the active matrix substrate;
   wherein the pre-tilt angle ranging from 3° to 30° is imparted to liquid-crystal molecules lying in proximity to the active matrix substrate by forming pillar structures that are made of an inorganic material and are slanted in a specific direction on the active matrix substrate.

11. An electronic device having an active-matrix liquid crystal display comprising:
- an active matrix substrate for fabricating a first group of pixel electrodes that are aligned in a prescribed direction and are supplied with picture signals of a first polarity, and a second group of pixel electrodes that are aligned to adjoin with the first group of pixel electrodes respectively and are supplied with picture signals of a second polarity;
- an opposite substrate that is arranged oppositely to the active matrix substrate;
- a liquid crystal layer having a positive dielectric anisotropy that is held between the active matrix substrate and the opposite substrate; and
- a first orientation film that is formed on a surface of the active matrix substrate by effecting an orientation process in a first orientation direction (Ra) in relation to alignment directions of the first and second groups of pixel electrodes, so that a pre-tilt angle ranging from 3° to 30° is imparted to liquid-crystal molecules lying in proximity to the active matrix substrate;
- wherein the pre-tilt angle ranging from 3° to 30° is imparted to liquid-crystal molecules lying in proximity to the active matrix substrate by forming mixtures of first and second pillar structures that are made of an inorganic material and are respectively slanted in different directions in plan view on the active matrix substrate.

12. An electronic device having an active-matrix liquid crystal display comprising;
- an active matrix substrate for fabricating a first group of pixel electrodes that are aligned in a prescribed direction and are supplied with picture signals of a first polarity, and a second group of pixel electrodes that are aligned to adjoin with the first group of pixel electrodes respectively and are supplied with picture signals of a second polarity;
- an opposite substrate that is arranged oppositely to the active matrix substrate;
- a liquid crystal layer having a positive dielectric anisotropy that is held between the active matrix substrate and the opposite substrate; and
- a first orientation film that is formed on a surface of the active matrix substrate by effecting an orientation process in a first orientation direction (Ra) in relation to alignment directions of the first and second groups of pixel electrodes, so that a pre-tilt angle ranging from 3° to 30° is imparted to liquid-crystal molecules lying in proximity to the active matrix substrate;
- wherein a planarization process is performed on prescribed regions for wiring signal lines driving the pixel electrodes and other regions for arranging the pixel electrodes on the active matrix substrate.

13. An active-matrix liquid crystal display comprising:
- an active matrix substrate;
- an opposite substrate that is arranged opposite to the active matrix substrate;
- a liquid crystal layer that is held between the active matrix substrate and the opposite substrate;
- an inorganic orientation film that is formed on a surface of the active matrix substrate and that is composed of at least one type of pillar structure having pillars which are slanted in a specific direction; and
- an organic orientation film that is formed on a surface of the opposite substrate and that is composed of orientational high molecules.

14. An active-matrix liquid crystal display according to claim 13, wherein the inorganic orientation film is composed of multiple types of pillar structures that are slanted in different directions on the active matrix substrate in plan view.

15. An active-matrix liquid crystal display according to claim 13, wherein the active matrix substrate fabricates a first group of pixel electrodes that are aligned in a prescribed direction and are supplied with picture signals of a first polarity, and a second group of pixel electrodes that are aligned to adjoin with the first group of pixel electrodes respectively and are supplied with picture signals of a second polarity.

16. An active-matrix liquid crystal display comprising:
- an active matrix substrate for fabricating a first group of pixel electrodes that are aligned in a prescribed direction and are supplied with picture signals of a first polarity, and a second group of pixel electrodes that are aligned to adjoin with the first group of pixel electrodes respectively and are supplied with picture signals of a second polarity;
- an opposite substrate that is arranged oppositely to the active matrix substrate; and
- a liquid crystal layer that is held between the active matrix substrate and the opposite substrate,
- wherein liquid-crystal molecules contained in the liquid crystal layer are subjected to prescribed orientations in a non-power mode in such a way that a first pre-tilt angle imparted to liquid-crystal molecules lying in proximity to the active matrix substrate becomes larger than a second pre-tilt angle imparted to liquid-crystal molecules lying in proximity to the opposite substrate.

17. An active-matrix liquid crystal display according to claim 16, wherein the first pre-tilt angle imparted to liquid-crystal molecules lying in proximity to the active matrix substrate ranges from 3° to 30° in the non-power mode.

18. An active-matrix liquid crystal display according to claim 16, wherein the liquid-crystal molecules lying in proximity to the active matrix substrate are initially oriented in a specific direction (Ra) in the non-power mode in such a way that the long-axis directions thereof are made substantially parallel with alignment directions of the first and second groups of pixel electrodes on the active matrix substrate.

19. An active-matrix liquid crystal display according to claim 16, wherein the liquid-crystal molecules lying in proximity to the active matrix substrate are oriented in the non-power mode in such a way that the long-axis directions thereof are slanted against alignment directions of the first and second groups of pixel electrodes, and are twisted in such a way that the long-axis directions thereof extend from the active matrix substrate to the opposite substrate and lie across the first and second groups of pixel electrodes in plan view.

20. An electronic device having an active-matrix liquid crystal display comprising:
- an active matrix substrate for fabricating a first group of pixel electrodes that are aligned in a prescribed direction and are supplied with picture signals of a first polarity, and a second group of pixel electrodes that are aligned to adjoin with the first group of pixel electrodes respectively and are supplied with picture signals of a second polarity;
- an opposite substrate that is arranged oppositely to the active matrix substrate; and
- a liquid crystal layer that is held between the active matrix substrate and the opposite substrate, wherein liquid-crystal molecules contained in the liquid crystal layer are subjected to prescribed orientations in a non-power mode in such a way that a first pre-tilt angle, which ranges from 3° to 30°, imparted to liquid-crystal molecules lying in proximity to the active matrix substrate becomes larger than a second pre-tilt angle imparted to liquid-crystal molecules lying in proximity to the opposite substrate;

wherein the liquid-crystal molecules lying in proximity to the active matrix substrate are initially oriented in a specific direction (Ra) in the non-power mode in such a way that the long-axis directions thereof are made substantially parallel with alignment directions of the first and second groups of pixel electrodes on the active matrix substrate.

21. An electronic device having an active-matrix liquid crystal display comprising:

an active matrix substrate for fabricating a first group of pixel electrodes that are aligned in a prescribed direction and are supplied with picture signals of a first polarity, and a second group of pixel electrodes that are aligned to adjoin with the first group of pixel electrodes respectively and are supplied with picture signals of a second polarity;

an opposite substrate that is arranged oppositely to the active matrix substrate; and a liquid crystal layer that is held between the active matrix substrate and the opposite substrate, wherein liquid-crystal molecules contained in the liquid crystal layer are subjected to prescribed orientations in a non-power mode in such a way that a first pre-tilt angle, which ranges from 3° to 30°, imparted to liquid-crystal molecules lying in proximity to the active matrix substrate becomes larger than a second pre-tilt angle imparted to liquid-crystal molecules lying in proximity to the opposite substrate;

wherein the liquid-crystal molecules lying in proximity to the active matrix substrate are oriented in the non-power mode in such a way that the long-axis directions thereof are slanted against alignment directions of the first and second groups of pixel electrodes, and are twisted in such a way that the long-axis directions thereof extend from the active matrix substrate to the opposite substrate and lie across the first and second groups of pixel electrodes in plan view.

22. An electronic device having an active-matrix liquid crystal display in which a liquid crystal layer (50) is held between an active matrix substrate (10) and an opposite substrate (20), said electronic device comprising:

a first group of pixel electrodes (9) that are aligned in a prescribed direction on the active matrix substrate and that are supplied with picture signals of a first polarity; and a second group of pixel electrodes (9) that are aligned to adjoin with the first group of pixel electrodes respectively and that are supplied with picture signals of a second polarity, wherein within the liquid crystal layer, liquid-crystal molecules lying in proximity to the active matrix substrate are initially subjected to a prescribed orientation in a non-power mode so that long-axis directions thereof substantially match alignment directions of the first and second groups of pixel electrodes respectively.

23. An electronic device having an active-matrix liquid crystal display in which a liquid crystal layer (50) is held between an active matrix substrate (10) and an opposite substrate (20), said electronic device comprising:

a first group of pixel electrodes (9) that are aligned in a prescribed direction on the active matrix substrate and that are supplied with picture signals of a first polarity; and a second group of pixel electrodes (9) that are aligned to adjoin with the first group of pixel electrodes respectively and that are supplied with picture signals of a second polarity, wherein within the liquid crystal layer, liquid-crystal molecules lying in proximity to the active matrix substrate are initially subjected to an orientation providing a prescribed orientation direction in a non-power mode so that long-axis directions thereof are slanted with respect to alignment directions of the first and second groups of pixel electrodes respectively, and they are also twisted to lie across the first and second groups of pixel electrodes respectively in plan view when being extended from the active-matrix substrate to the opposite substrate.

24. A projector comprising:

a light source;

an active-matrix liquid crystal display for modulating light radiated from the light source, wherein the active-matrix liquid crystal display in which a liquid crystal layer is held between an active matrix substrate and an opposite substrate, comprises:

a first group of pixel electrodes that are aligned in a prescribed direction on the active matrix substrate and that are supplied with picture signals of a first polarity; and a second group of pixel electrodes that are aligned to adjoin with the first group of pixel electrodes respectively and that are supplied with picture signals of a second polarity, wherein within the liquid crystal layer, liquid-crystal molecules lying in proximity to the active matrix substrate are initially subjected to an orientation providing a prescribed orientation direction in a non-power mode so that the long-axis directions thereof are slanted with respect to alignment directions of the first and second groups of pixel electrodes respectively, and they are also twisted to lie across the first and second groups of pixel electrodes respectively in plan view when being extended from the active-matrix substrate to the opposite substrate; and;

an optical projection system for projecting the light output from the active-matrix liquid crystal display.

25. A projector comprising:

a light source;

an active-matrix liquid crystal display for modulating light radiated from the light source, the active-matrix liquid crystal display in which a liquid crystal layer is held between an active matrix substrate and an opposite substrate, comprising:

a first group of pixel electrodes that are aligned in a prescribed direction on the active matrix substrate and that are supplied with picture signals of a first polarity; and a second group of pixel electrodes that are aligned to adjoin with the first group of pixel electrodes respectively and that are supplied with picture signals of a second polarity, wherein within the liquid crystal layer, liquid-crystal molecules lying in proximity to the active matrix substrate are initially subjected to a prescribed orientation in a non-power mode so that long-axis directions thereof substantially match alignment directions of the first and second groups of pixel electrodes respectively; and;

an optical projection system for projecting the light output from the active-matrix liquid crystal display.

26. A projector comprising:

a light source;

an active-matrix liquid crystal display for modulating light radiated from the light source, the active-matrix liquid crystal display in which a liquid crystal layer is held between an active matrix substrate and an opposite substrate, comprising;

a first group of pixel electrodes that are aligned in a prescribed direction on the active matrix substrate and that are supplied with picture signals of a first polarity;

a second group of pixel electrodes that are aligned to adjoin with the first group of pixel electrodes respectively and that are supplied with picture signals of a second polarity;

a first orientation film that is formed on a surface of the active matrix substrate by effecting an orientation process in a first orientation direction (Ra) that is slanted with respect to alignment directions of the first and second groups of pixel electrodes; and a second orientation film that is formed on a surface of the opposite substrate by effecting an orientation process in a second orientation direction (Rb) that is slanted with respect to the alignment directions of the first and second groups of pixel electrodes, wherein one of the first and second orientation directions is directed towards the first group of pixel electrodes in plan view, while the other is directed towards the second group of pixel electrodes in plan view; and;

an optical projection system for projecting the light output from the active-matrix liquid crystal display.

27. A projector comprising:

a light source;

an active-matrix liquid crystal display for modulating light radiated from the light source, the active-matrix liquid crystal display comprising:

an active matrix substrate for fabricating a first group of pixel electrodes that are aligned in a prescribed direction and are supplied with picture signals of a first polarity, and a second group of pixel electrodes that are aligned to adjoin with the first group of pixel electrodes respectively and are supplied with picture signals of a second polarity;

an opposite substrate that is arranged oppositely to the active matrix substrate; and a liquid crystal layer that is held between the active matrix substrate and the opposite substrate, wherein liquid-crystal molecules contained in the liquid crystal layer are subjected to prescribed orientations in a non-power mode in such a way that a first pre-tilt angle imparted to liquid-crystal molecules lying in proximity to the active matrix substrate becomes larger than a second pre-tilt angle imparted to liquid-crystal molecules lying in proximity to the opposite substrate; and;

an optical projection system for projecting the light output from the active-matrix liquid crystal display.

* * * * *